(12) United States Patent
Agrawal et al.

(10) Patent No.: US 11,683,246 B2
(45) Date of Patent: Jun. 20, 2023

(54) EDGE-BASED INTELLIGENCE FOR ANOMALY DETECTION

(71) Applicant: Ayla Networks, Inc., Milpitas, CA (US)

(72) Inventors: Ashish Agrawal, Saratoga, CA (US); Pedro Leonardo, San Francisco, CA (US)

(73) Assignee: Ayla Networks, Inc., Milpitas, CA (US)

( * ) Notice: Subject to any disclaimer, the term of this patent is extended or adjusted under 35 U.S.C. 154(b) by 56 days.

(21) Appl. No.: 17/196,877

(22) Filed: Mar. 9, 2021

(65) Prior Publication Data

US 2022/0294715 A1    Sep. 15, 2022

(51) Int. Cl.
| | | |
|---|---|---|
| *H04L 43/04* | (2022.01) | |
| *H04L 43/50* | (2022.01) | |
| *G06N 3/04* | (2023.01) | |
| *G06N 3/08* | (2023.01) | |
| *H04L 43/06* | (2022.01) | |
| *H04L 43/16* | (2022.01) | |
| *H04L 9/40* | (2022.01) | |
| *H04L 41/16* | (2022.01) | |

(52) U.S. Cl.
CPC ............... *H04L 43/04* (2013.01); *G06N 3/04* (2013.01); *G06N 3/08* (2013.01); *H04L 43/06* (2013.01); *H04L 43/16* (2013.01); *H04L 43/50* (2013.01); *H04L 63/1408* (2013.01); *H04L 63/1416* (2013.01); *H04L 63/1425* (2013.01); *H04L 41/16* (2013.01)

(58) Field of Classification Search
CPC ......... H04L 43/04; H04L 43/16; H04L 43/06; H04L 63/1425; H04L 63/1408; H04L 63/1416; H04L 41/16; G06N 3/08
See application file for complete search history.

(56) References Cited

U.S. PATENT DOCUMENTS

| | | | | |
|---|---|---|---|---|
| 7,716,737 | B2 * | 5/2010 | Wilken | ............... H04L 63/1416 709/224 |
| 9,860,257 | B1 * | 1/2018 | Kumar | ................ H04L 63/1425 |
| 9,979,606 | B2 | 5/2018 | Gupta et al. | |
| 10,057,264 | B1 | 8/2018 | ElNakib | |
| 10,230,747 | B2 * | 3/2019 | Kopp | .................. H04L 63/1425 |
| 2016/0301707 | A1 | 10/2016 | Cheng et al. | |
| 2017/0048308 | A1 | 2/2017 | Qaisar | |
| 2017/0063905 | A1 | 3/2017 | Muddu et al. | |
| 2017/0102978 | A1 | 4/2017 | Pallath | |

(Continued)

FOREIGN PATENT DOCUMENTS

WO    2018116123 A1    6/2018

*Primary Examiner* — Nam T Tran
(74) *Attorney, Agent, or Firm* — Lowenstein Sandler LLP

(57) ABSTRACT

A computing device receives one or more network communication anomaly conditions that indicate abnormal network communication traffic for a class of devices associated with the computing device; monitors network communication data of the computing device; determines whether the network communication data of the computing device satisfies the one or more network communication anomaly conditions; and responsive to determining that the network communication data of the computing device satisfies the one or more network communication anomaly conditions, performs an anomaly detection operation for the computing device.

23 Claims, 8 Drawing Sheets

(56) References Cited

U.S. PATENT DOCUMENTS

| | | | |
|---|---|---|---|
| 2017/0279833 A1* | 9/2017 | Vasseur | H04L 63/1425 |
| 2017/0279838 A1* | 9/2017 | Dasgupta | H04L 63/1425 |
| 2017/0289184 A1 | 10/2017 | C et al. | |
| 2017/0318037 A1 | 11/2017 | Rolia et al. | |
| 2018/0060159 A1 | 3/2018 | Justin et al. | |
| 2018/0096261 A1 | 4/2018 | Chu et al. | |
| 2018/0129805 A1 | 5/2018 | Samuel | |
| 2018/0144139 A1 | 5/2018 | Cheng et al. | |
| 2018/0189667 A1 | 7/2018 | Tsou et al. | |
| 2018/0211176 A1 | 7/2018 | Khurshudov et al. | |
| 2018/0234454 A1 | 8/2018 | Aggarwal et al. | |
| 2018/0253569 A1 | 9/2018 | Swierk et al. | |
| 2019/0007447 A1* | 1/2019 | Barnes | H04L 63/1425 |
| 2019/0327271 A1* | 10/2019 | Saxena | H04L 63/104 |
| 2020/0327371 A1* | 10/2020 | Sharma | G06N 5/04 |
| 2021/0385233 A1* | 12/2021 | Chopra | H04L 63/1416 |

* cited by examiner

EDGE-BASED INTELLIGENCE FOR ANOMALY DETECTION

BACKGROUND

Many modern appliances, consumer devices, and other devices include embedded systems that are configured to perform one or more dedicated functions for a device. The growing number of deployed devices with embedded systems create an increased opportunity for third parties to obtain unauthorized access to these devices, and subsequently gain access to a local network or cloud platform to which the devices are connected.

BRIEF DESCRIPTION OF THE DRAWINGS

Reference will now be made to the accompanying drawings showing example embodiments of the present application.

DETAILED DESCRIPTION OF EMBODIMENTS

Figure 1:
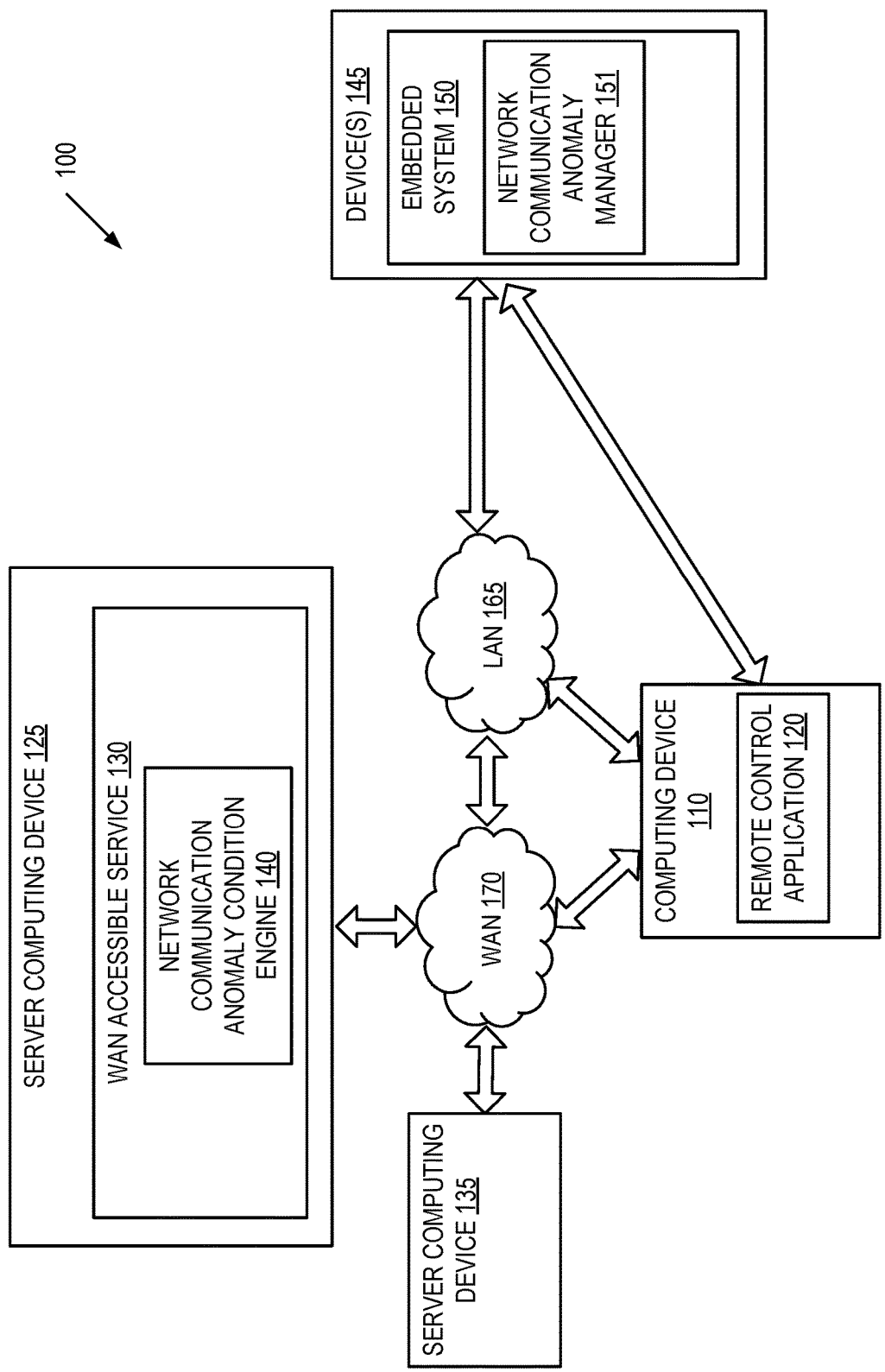
FIG. 1 is a block diagram depicting an example network architecture including remotely accessible embedded systems.

Embodiments described herein are directed to edge-based intelligence for anomaly detection on devices having embedded systems. Devices with embedded systems (e.g., an Internet of Things (IoT) enabled device) can communicate with cloud computing environments or other server systems using particular communication protocols that specify the sequence, format, and/or content of network communication messages. Third parties seeking to gain unauthorized access to embedded systems or their associated networks may attempt to do so by interfering with the sequence or content of communication messages passed between the embedded system and the cloud/server system. In such instances, any deviations from the normal sequence, format, and/or content of network communications to/from embedded system (e.g., network communication "anomalies") can be indicative of possible external threats to the devices or connected networks.

In embodiments, a device having an embedded system can monitor its own network communication traffic for conditions indicating that the communication traffic is abnormal for the device. The embedded system is capable of receiving a set of network communication anomaly conditions and/or a trained machine learning model trained to perform anomaly detection of network traffic from a wide area network (WAN) accessible service (e.g., a web service or "cloud" service). In embodiments, the network communication anomaly conditions may be a set of conditions that indicate when the device with the embedded system is conducting network communications that deviate from its normal operation. An edge device may input network communications data into a trained machine learning model that has been trained to operate on the edge device, which may have limited processing and/or memory capabilities, which may output an indication as to whether or not a network anomaly is detected. The embedded system, upon detecting anomaly conditions, may then perform an operation to address the identified network communication anomaly. The WAN accessible service may analyze the device usage information associated with a class of devices (e.g., observed network communication behavior for the class of devices) and determine the network communication anomaly conditions that are most indicative of abnormal network traffic for that class of devices. The WAN accessible service may then provide the network communication anomaly conditions to a device with an embedded system so the device may conduct its own self-monitoring. In some embodiments, the WAN accessible service trains the machine learning model to perform anomaly detection, and then sends the trained machine learning model to edges devices for use.

Conventional systems implement threat assessment for larger computers such as desktops, laptops, server systems by way of virus/malware monitoring or firewall systems that protect against unauthorized communications. Conventional systems, however, often fail to address vulnerabilities on devices with embedded systems since these types of devices typically have limited resources available to conduct robust threat assessment. Additionally, since devices with embedded systems are often resource limited, they are often regarded by conventional systems as not presenting a security threat. Moreover, those systems that do implement security protocols for embedded systems typically monitor devices for attempts to manipulate the operation of the device (e.g., control the device itself) rather than attempts use network communication to access the data on the device or its connected network(s).

Aspects of the present disclosure remedy the above noted and other deficiencies by implementing an network communication anomaly manager within an embedded system of a device that can intelligently determine whether observed network communication activity indicate communication anomalies. The associated WAN accessible service can analyze historical communication data for a class of devices to determine the conditions that are indicative of communication anomalies for the device and provide those conditions to the embedded system. In one embodiment, this includes training a machine learning model using the historical communication data. The historical communication data may be labeled, where labels may indicate lack or presence of anomalies, in which case supervised learning may be performed to train the machine learning model. Alternatively, the historical communication data may not be labeled, in which case unsupervised learning may be performed to train the machine learning model. For example, the historical communication data may be assumed to include only normal communications, and may be used to generate a cluster or group of properties/features representative of normal communications. If new network communication data that is input into the trained machine learning model has properties or features that fall outside of those in the cluster or group, then the new network communication data may be classified as anomalous. The embedded system may assume control over threat assessment for the device and if a communication anomaly is detected, take appropriate action to protect the device and its associated networks(s) against unauthorized access.

Aspects of the present disclosure provide advantages over conventional systems by significantly improving intrusion detection for embedded systems. Since the embedded system of a device has direct access to the most current information regarding its own usage state than does any connected server, the network communication anomaly manager as described herein can make a more accurate assessment of network communications that deviate from the normal behavior of the device. The network communication anomaly manager can self-monitor for security intrusions without waiting for the WAN accessible service to determine exactly when an intrusion occurs. Thus, a device can monitor its communication activity without requiring direct connection to a network security component of the WAN accessible service. Accordingly, the device can self-regulate in instances where the connection to WAN accessible service is unavailable due to a third party intrusion, thereby allowing the device to take appropriate action without needing the WAN accessible service to do so. This can significantly improve the security of the device itself, as well as the security of any connected networks or services.

Referring now to the figures, FIG. 1 is a block diagram depicting an example network architecture 100 including remotely accessible embedded systems (e.g., of IoT devices) and computing devices that interact with the embedded systems. The network architecture 100 includes one or more devices 145 and a computing device 110 connected to a local area network (LAN) 165. The devices 145 are devices with embedded systems 150 (e.g., IoT devices), and may include, for example, electrical appliances such as refrigerators, ovens, washers, driers, dishwashers, thermostats, alarms, air conditioners, ceiling fans, televisions, radios, receivers, amplifiers, and so forth. The devices 145 may also include consumer devices such as digital watches, music players, game consoles, digital cameras, printers, and so forth. Other examples of devices 145 include stationary devices such as HVAC systems, traffic lights, factory controllers, signs, electronic billboards, sprinkler systems, and irrigation control systems, as well as medical devices. Devices 145 may also be any other type of device that includes an embedded system 150.

An embedded system 150 is a class of computing device that is embedded into another device 145 as one component of the device 145. The device 145 typically also includes other hardware, electrical and/or mechanical components that may interface with the embedded system. Embedded system 150 is typically configured to handle a particular task or set of tasks, for which the embedded system 150 may be optimized. Accordingly, the embedded system 150 may have a minimal cost and size as compared to general computing devices.

The embedded system 150 may include a communication module (not shown) that enables the embedded system 150 (and thus the device 145) to connect to the LAN 165, or alternatively, directly to computing device 110. The communication module may be configured to manage security, manage sessions, manage communications with external devices, and so forth. In one embodiment, the communication module is configured to communicate using Wi-Fi®. Alternatively, the communication module may be configured to communicate using Cellular (3G, 4G, 5G, NB-IoT), LoRAWAN, Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols.

The LAN 165 may include a router, switch, bridge or other network device (not shown) that enables communication between multiple devices (e.g., device 145, computing device 110, etc.) connected to the LAN 165. The network device may provide wired connections to the LAN using, for example, Ethernet ports, universal serial bus (USB) ports and/or Firewire® ports. The network device may additionally provide wireless connections to the LAN using, for example, a Wi-Fi® transceiver.

Some embedded systems 150 may not support any of the communication types supported by the network device. For example, device 145 may support Zigbee, Bluetooth, or the like. To enable such devices to connect to the LAN 165, the LAN 165 may include a gateway device (not shown) connected to the network device via one of the connection types supported by the network device (e.g., via Ethernet or Wi-Fi®). The gateway device may additionally support other communication protocols such as Zigbee, PLC and/or Bluetooth, and may translate between supported communication protocols. Accordingly, some devices 145 may connect to the LAN through the gateway device.

The LAN 165 is connected to a wide area network (WAN) 170. The WAN 170 may be a private WAN (e.g., an intranet) or a public WAN such as the Internet, or may include a combination of a private and public network. The LAN 165 may include a router and/or modem (e.g., a cable modem, a direct serial link (DSL) modem, a Worldwide Interoperability for Microwave Access (WiMAX®) modem, an long term evolution (LTE®) modem, etc.) that provides a connection to the WAN 170.

The WAN 170 may include or connect to server computing devices 125-135. The server computing devices 125-135 may include a physical machine and/or a virtual machine hosted by a physical machine. The physical machine may be a rackmount server, a desktop computer, or other computing device. In one embodiment, the server computing devices 125-135 can include a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

The server computing device 125 hosts a WAN accessible service 130, which may be a web based service and/or a cloud service (e.g., a web based service hosted in a cloud computing platform). The WAN accessible service 130 may maintain a session (e.g., via a continuous or intermittent connection) with the embedded system 150. Alternatively, the WAN accessible service 130 may periodically establish sessions with the embedded system 150. Via a session with an embedded system 150, WAN accessible service 130 may issue commands to the embedded system and/or receive status updates from the embedded system. The commands may be commands to change a state of one or more parameters of a device controllable by the embedded system. For example, if the embedded system is embedded in a heater or thermostat, then the commands may include commands to increase or decrease a temperature. In another example, if the embedded system is embedded in a home automation system, then the commands may include commands to turn on or off lights.

Status updates received from the embedded system 150 may identify values or states of some or all detectable parameters of device 145 that the embedded system 150 is included in. Such values or states may change based direct user interaction with the devices. Such values or states may also change responsive to commands sent to the embedded system 150 by the WAN accessible service 130 and/or by computing device 110. By maintaining or periodically establishing sessions with the embedded systems 150, the WAN accessible service 130 may maintain up-to-date information on the states of the device 145. In some implementations, the status updates received from embedded system 150 can include device related information associated with device 145 such as a unique identifier associated with the device (e.g., a specific device serial number (DSN)), the version number of a firmware component installed on embedded system 150, or the like. WAN accessible service may use the status updates to determine when the firmware installed on embedded system 150 becomes outdated and is in need of update. This may occur when the firmware is updated to provide enhanced capabilities, to correct software errors, to replace expired encryption certificates, or the like.

The WAN accessible service 130 may additionally maintain a session (e.g., via a continuous or intermittent connection) with remote control application 120 of computing device 110. Via a session with remote control application 120, WAN accessible service 130 may receive the device related information described above in instances when embedded system 150 is unable to connect directly to WAN accessible service 130. In instances where the embedded system 150 cannot connect directly to WAN accessible service 130 (e.g., as a result of first time use of device 145, due to a problem with the version of the firmware component installed on embedded system 150, etc.), WAN accessible service may use the session with remote control application 120 as a proxy for communicating with, and delivering firmware updates to, embedded system 150.

In various implementations, a communication session between computing device 110 and WAN accessible service 130 can be conducted in accordance with a communication protocol associated with the activities of device 110. The communication protocol can specify a set of communication rules and/or sequence of communication messages for providing authentication and/or authorization of the device 110 to communicate with WAN accessible service 130. Additionally, the communication protocol can specify the types of communication messages and content of communication messages for the communication session. The communication protocol can specify how the device 110 authenticates itself with WAN accessible service 130, how device 110 sends notifications to WAN accessible service 130, how device 110 sends/receives data points to/from WAN accessible service 130 related to sensor data, device state, and/or device properties, how device 110 sends/receives device control commands to/from WAN accessible service 130, or other types and/or sequences of communication data.

In some instances, the communication protocol for a device 110 may be associated with a device type for the device. For example, the communication protocol for a thermostat that includes an embedded system can specify a particular method of authentication and data exchange. Similarly, the communication protocol for a ceiling fan that includes an embedded system can specify a different method of authentication and data exchange. In various implementations, each distinct device type or class of devices can utilize a specific sequence of messages for the transactions performed by that device type or class.

In an illustrative example, a communication protocol can specify that the message sequence can include an authorization request sent from device 110 to WAN accessible service 130, an authorization approval sent from WAN accessible service 130 to device 110, a data point message (e.g., a message that includes a temperature measurement in the case of a thermostat) sent from device 110 to WAN accessible service 130, and an acknowledgment message from WAN accessible service 130 to device 110 that closes the transaction. Other sequences of messages can be used for various device types and for various communication purposes (e.g., control commands to change device state of device 110, different types of messages for different types of sensors, etc.).

In some implementations, WAN accessible service 130 can include a network communication anomaly condition engine 140 to analyze the network communications between WAN accessible service 130 and devices 145 and identify communication events that deviate from normal communications (e.g., anomaly conditions) in view of the communication protocol for the device 145. Network communication anomaly condition engine 140 can analyze captured communication traffic for multiple devices connected to/communicating with WAN accessible service 130 to determine communication conditions that indicate whether or not a particular device 145 (or class of devices 145) is communicating normally with respect to its associated communication protocol.

In some implementations, network anomaly communication engine 140 includes one or more trained machine learning models trained to receive network communication traffic as an input and to output a classification for the network communication traffic as being either anomalous or normal. The machine learning model may be a neural network, a decision tree, a random forest model, a regression model, a clustering model, and so on. In some implementations, network anomaly communication engine 140 includes a rules-based logic that classifies network communication traffic as normal or anomalous. In some implementations, network anomaly engine 140 includes different logics and/or trained models for different types of devices 145.

Network communication anomaly condition engine 140 may first identify a set of candidate devices that are connected to WAN accessible service 130. Network communication anomaly condition engine 140 may identify the set of candidate devices based on one or more device attributes associated with the device. A device attribute may be device type for the device (e.g., thermostat, refrigerator, ceiling fan, etc.), a property of the device (e.g., a device serial number, model number, etc.), a client identifier (e.g., information associated with the device owner or client), a device location, a device sensor value or state, a device usage value (e.g., the number of times a device has been used over a particular period of time), a class of device (e.g., electrical appliance, consumer device, stationary device, etc.), or other similar types of information.

Network communication anomaly condition engine 140 may then determine one or more network communication anomaly conditions that indicate abnormal network communication traffic for the type or class of devices associated with the identified target set of candidate devices. The network communication anomaly conditions may include a set of rules that can be used by a device 145 to determine whether or not a particular communication session conforms to a normal communication session in view of the communication protocol for that device. For example, the anomaly conditions may include a particular message format for a message (e.g., the layout for the message), a particular message content for a message (e.g., the type of data included in the message), a particular message size for a message (e.g., the amount of data included in the message), particular message source/destination information (e.g., a communication port, address, or identifier associated with the source/destination of the message), a particular message sequence, a particular level of observed communication activity (e.g., if network activity meets a threshold value), a particular level of observed device activity (e.g., if the main functionality of the device is not currently active), or the like.

In some implementations, the anomaly conditions can specify a particular set of circumstances that indicate an anomaly condition. For example, messages over a particular size, from a particular source, in a particular sequence, etc. Alternatively, the anomaly conditions can specify a normal communication state. In such instances, any observed behavior that deviates from the normal state can indicate a communication anomaly condition. Should the device 145 observe any anomaly conditions specified by the rules (or that deviate from a predefined normal communication state), the device 145 may determine that the network communication is an anomaly (e.g., the communication is not normal for the device type of the device). In some implementations, the anomaly conditions may include a simplified machine learning classifier component that is executed by the device 145. In such cases, the simplified classifier component can monitor the network communications and detect the presence of the anomaly conditions.

In some implementations, network communication anomaly condition engine 140 may utilize a machine learning neural network or other machine learning model to analyze any collected device related information and/or network communication information for the devices in the set of candidate devices to determine the set of anomaly conditions. For example, network communication anomaly condition engine 140 may analyze collected network communications of the devices in the target set to identify particular sequences of commonly occurring communication sessions for the devices, typical message sizes, message formats, message addressing attributes, or the like. Alternatively, network communication anomaly condition engine 140 may receive the set of anomaly conditions from a user interface of a management console.

In some implementations, network anomaly communication engine 140 trains one or more machine learning models to receive network communication traffic as an input and to output a classification for the network communication traffic as being either anomalous or normal. The machine learning model may be a neural network (e.g., a convolutional neural network, a deep neural network, a shallow neural network, a recurrent neural network (RNN), and so on), a decision tree, a random forest model, a regression model, a clustering model, and so on. The one or more machine learning models may be trained using supervised learning and/or unsupervised learning. In some implementations, network anomaly engine 140 trains multiple different machine learning models to perform anomaly detection of network communication traffic, where each of the different machine learning models may be trained for different types of classes of devices. The processing resources and/or memory resources of the devices on which the machine learning models will be deployed may be taken into consideration when selecting model architectures, when setting hyper parameters of the models, and or when training the machine learning models to ensure that the edge devices on will have sufficient processing resources and memory resources to use the machine learning models.

Network communication anomaly condition engine 140 may then select a device 145 from the set of candidate devices to receive the anomaly conditions and/or trained machine learning model. In some implementations, network communication anomaly condition engine 140 may process the set of candidate devices as a list of candidate devices and select the device to receive the anomaly conditions and/or trained machine learning model by selecting one of the devices from the list. In some implementations, network communication anomaly condition engine 140 may select and process the devices from the list one at a time. Alternatively, network communication anomaly condition engine 140 may select a subset of the candidate devices to receive the anomaly conditions and/or trained machine learning models as a group based on a selection criteria (e.g., location, client, etc.). The device may also be selected from a list of devices presented by the user interface of the management console.

Once the candidate device 145 (or devices 145) has been selected to receive the anomaly conditions and/or trained machine learning models, network communication anomaly condition engine 140 may provide the anomaly conditions and/or trained machine learning models to the selected device 145. In some implementations, WAN accessible service 130 may notify the embedded system 150 of device 145 that anomaly conditions and/or a new version of an appropriate trained machine learning model are available for download by the device. Alternatively, WAN accessible service 130 can send the anomaly conditions and/or trained machine learning model to the embedded system of device 145.

The device 145 may subsequently monitor its network communications for anomaly conditions to determine whether a network communication anomaly has occurred during a communication session with WAN accessible service 130. In some implementations, network communication anomaly condition engine 140 may send the anomaly conditions and/or trained machine learning model to the selected device 145, causing the device 145 to monitor for anomalous conditions. Alternatively, network communication anomaly condition engine 140 may send a notification to the device 145 to cause the device 145 to retrieve the anomaly conditions and/or trained machine learning model from WAN accessible service 130.

In some implementations, the server computing device 135 can host additional device related information that can be used by network communication anomaly condition engine 140A, which may be a web based service and/or a cloud service (e.g., a web based service hosted in a cloud computing platform). Server computing device 135 may provide the ability to host data separately from WAN accessible service 130. One example of such a service is Amazon's® Simple Storage Service (S3®).

In some implementations, embedded system 150 of device 145 may include a network communication anomaly manager 151. Network communication anomaly manager 151 may be responsible for receiving the anomaly conditions and/or trained machine learning models from WAN accessible service 130, and monitoring the network communications of device 145 for the presence of the anomaly conditions (e.g., optionally using a received trained machine learning model). In some implementations, network communication anomaly manager 151 monitors network communication traffic, and/or inputs the network communication traffic into the trained machine learning model. The trained machine learning model may then output a probability that the network communication traffic is anomalous. Should an anomaly condition be detected, network communication anomaly manager 151 can take an appropriate action for the device 145 to address the detected anomaly.

Network communication anomaly manager 151 may receive the anomaly conditions and/or trained machine learning model from WAN accessible service 130 as described above. As noted above, the anomaly conditions may be a set of rules that network communication anomaly manager 151 can use when monitoring the network communications of device 145. Alternatively, the anomaly conditions may be incorporated into a simplified machine learning classifier (e.g., a machine learning model trained to identify network communication anomalies) that is used by network communication anomaly manager 151 to detect the presence of a network communication anomaly. In such instances, network communication anomaly manager 151 can capture the observed device communications and input those observed communications into the classifier. The classifier can then indicate to network communication anomaly manager 151 whether or not a network communication anomaly has occurred. In some implementations, network communication anomaly manager 151 can use the anomaly conditions to detect a device-based anomaly (e.g., an anomaly with the communication data generated by the device). Alternatively, or additionally, network communication anomaly manager 151 can use the anomaly conditions to detect a server-based anomaly (e.g., an anomaly with the communication data associated with the WAN accessible service 130).

Responsive to determining that the network communication data of device 145 satisfies the anomaly conditions, network communication anomaly manager 151 may perform an anomaly detection operation for the device 145. In instances where the anomaly is device-based, network communication anomaly manager 151 can perform an operation to send an alert to the WAN accessible service 130, disable device communications, power down the device, or the like. In instances where the anomaly is server-based, network communication anomaly manager 151 can perform an operation to disable the network communication with that server, send alert communications, or the like.

An example of a WAN accessible service with an associated network communication anomaly condition engine is described in further detail below with respect to FIG. 2. An example of an embedded system with an associated network communication anomaly manager is described in further detail below with respect to FIG. 3.

Computing device 110 may include portable devices such as electronic book readers, portable digital assistants, mobile phones, laptop computers, portable media players, tablet computers, cameras, video cameras, netbooks, notebooks, and the like. Computing device 110 may also include traditionally stationary devices such as desktop computers, gaming consoles, digital video disc (DVD) players, media centers, and the like. Computing device 110 may connect to the WAN 170 and/or to the LAN 165. Computing device 110 may connect to the LAN 165 when it enters a proximity to the LAN 165 sufficient to exchange data with a network device associated with the LAN 165. This may include coming within a particular proximity to a wireless antenna associated with the LAN 165 and/or physically connecting to the LAN 165 via, for example, an Ethernet cable.

Computing device 110 can include a remote control application 120. The remote control application 120 may be configured to interface with and/or control one or more of the devices 145 via the devices' embedded systems 150. In one embodiment, the computing device 110 may include separate remote control applications for each of the embedded systems of any devices in the network. Alternatively, the computing device 110 may include a single remote control application that is capable of communicating with and controlling embedded system for multiple different devices. Remote control application 120 may communicate with embedded system 150 using an encrypted connection to LAN 165, directly using an unencrypted connection with embedded system 150 operating in AP mode, or indirectly using an encrypted connection with WAN accessible service 130.

While computing device 110 is connected to WAN 170, remote control application 120 may establish a session with the WAN accessible service 130. The WAN accessible service 130 may provide an interface for indirectly controlling and monitoring the device 145. If a user desires to change a state of a device, the user may issue a command via the remote control application 120, and that command may be sent to the WAN accessible service 130. The WAN accessible service 130 may then forward the command on to the appropriate embedded system. Additionally, when the WAN accessible service 130 receives updated state information for a device from an embedded system, the WAN accessible service 130 may forward the state information on to the remote control application. This may enable users to connect to and control the device 145 from anywhere they have access to the Internet.

When a computing device 110 connects to the LAN 165, the remote control application 120 may automatically establish a direct connection to embedded system 150 if embedded system 150 is also connected to the LAN 165. While the computing device 110 is connected to the LAN 165, it may maintain a session with, and control, embedded system 150 even in the absence of a connection to WAN 170 (e.g., if LAN 165 loses a broadband Internet connection).

In an illustrative example, if the computing device is a mobile phone, then the computing device may connect to the LAN 165 using a Wi-Fi® radio. The computing device may connect to WAN 170 and WAN accessible service 130 through a connection with a wireless carrier system (e.g., though a global system for mobile communications (GSM), code division multiple access (CDMA), wideband code division multiple access (WCDMA), time division multiple access (TDMA), universal mobile telecommunications system (UMTS), long term evolution (LTE), worldwide interoperability for microwave access (WiMAX) or other wireless communication protocol connection).

Remote control application 120 may additionally be used as a proxy to provide network communication anomaly conditions to embedded system 150 when WAN accessible service 130 cannot communicate with embedded system 150. Network communication anomaly conditions may be provided to embedded system 150 during first time setup device 145, or sometime after device 145 is set up if a condition is encountered that may prevent embedded system 150 from communicating with WAN accessible service 130 directly.

Figure 2:
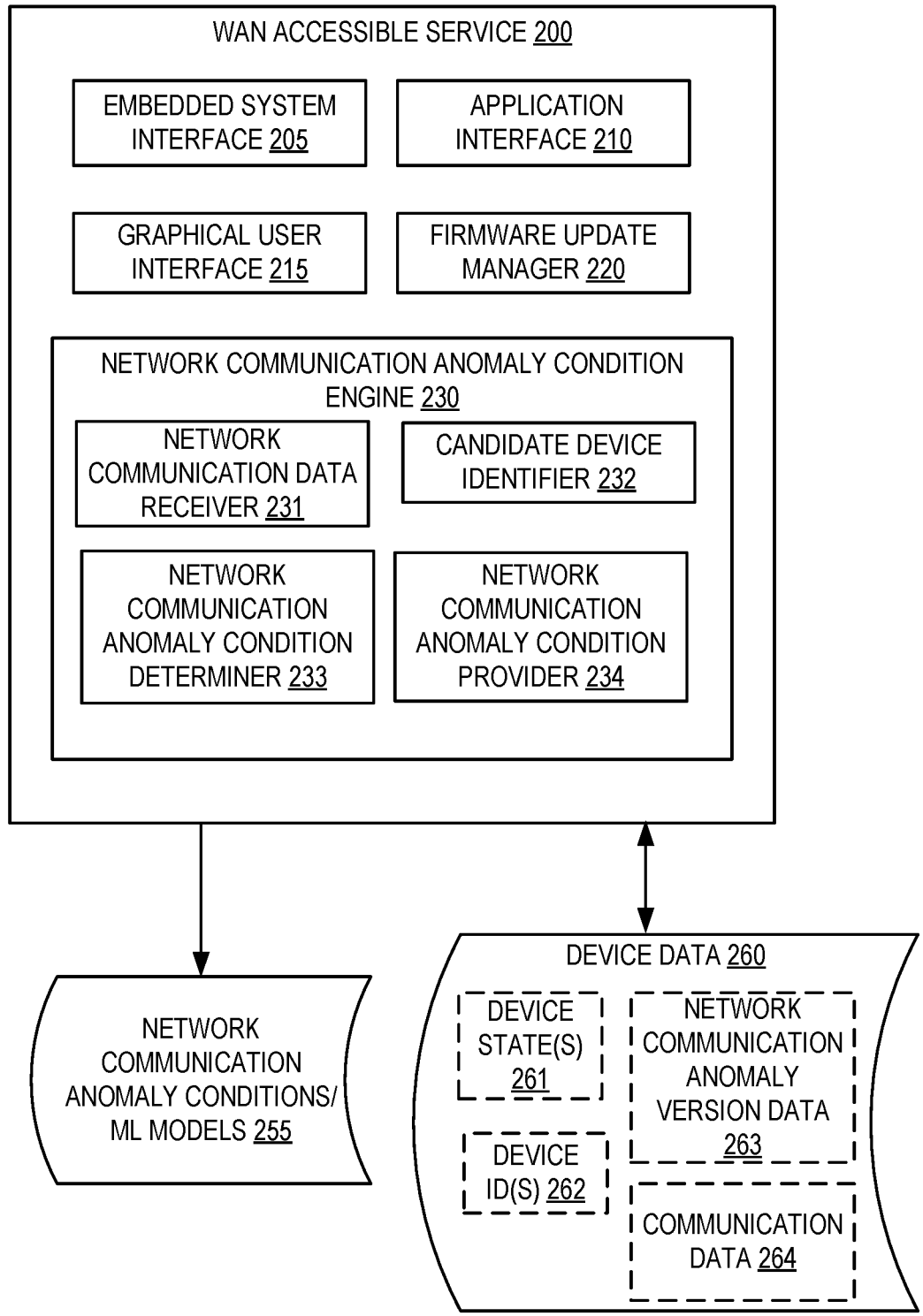
FIG. 2 is a block diagram of an example embodiment of a wide area network (WAN) accessible service.

FIG. 2 is a block diagram of an example embodiment of a WAN accessible service 200, which in one embodiment corresponds to WAN accessible service 130 of FIG. 1. WAN accessible service 200 may include an embedded system interface 205, an application interface 210, a graphical user interface 215, a firmware update manager 220, and a network communication anomaly condition engine 230. Alternatively, the functionality of one or more of the embedded system interface 205, an application interface 210, a graphical user interface 215, a firmware update manager 220, and a network communication anomaly condition engine 230 may be combined into a single module or divided into multiple sub-modules.

Embedded system interface 205 is responsible for connecting to embedded systems. WAN accessible service 200 may establish secure sessions with and/or maintain secure sessions with one or many embedded systems. Via the active sessions, embedded system interface 205 may send notifications, property updates and/or control messages to the embedded systems and receive acknowledgments, status updates (e.g., device state 261), and other information (e.g., device ID 262) from the embedded systems.

Application interface 210 is responsible for connecting to remote control applications. Application interface 210 may enable users to log in to user accounts on WAN accessible service 200 by providing the proper credentials. A secure session may be established with the remote control applications as a part of the log in process. Once a secure session is established (e.g., via SSL) and a remote control application is logged into a particular user account, application interface 210 may provide the remote control application with updated status information for embedded systems to which the remote control application is registered. Additionally, application interface 210 may receive commands from the remote control application for modifying a state of (or otherwise controlling) one or more embedded systems with which the remote control application is registered. Application interface 210 may receive device related information associated with an embedded system, such as a unique identifier associated with the device (e.g., a specific device serial number (DSN)), the version number of a firmware component installed on an embedded system, or the like. Application interface 210 may store the device related information in device data 260 so that it may be used by network communication anomaly manager 220 (or other components of WAN accessible service 200) to determine if a set of network communication anomaly conditions (e.g., network communication anomaly conditions 255) is available for installation on an embedded system.

Graphical user interface 215 may be a web interface that is accessible from computing devices using a web browser. Accordingly, computing devices that do not include a remote control application may still log into a user account for monitoring and/or controlling embedded systems via the graphical user interface 215. In some implementations, graphical user interface 215 may be used to identify a subset of candidate devices from a group of devices that are eligible for distribution of a set of network communication anomaly conditions. Similarly, graphical user interface 215 may be used by a user to directly network communication anomaly conditions to be sent to a device for use with monitoring network communications.

Firmware update manager 220 may determine whether a digital image for a firmware update is available for the embedded system of a particular device or group of devices. In some implementations, firmware update manager 220 may use the device related information received by application interface 210 to make this determination. In one embodiment, firmware update manager 220 may compare the specific DSN of the device received in the device related information to a list of DSNs for which a firmware update (e.g., an encrypted digital image) is available. In another embodiment, firmware update manager 220 may compare the version of the firmware component installed on the embedded system of the device to a list of known outdated firmware versions for which an encrypted digital image is available. In some implementations, generation of a firmware update for a device can trigger the regeneration of updated network communication anomaly conditions for that device that account for any communication protocol changes associated with the firmware update.

Network communication anomaly condition engine 230 may be responsible for identifying one or more candidate devices to receive the network communication anomaly conditions, determining the network communication anomaly conditions for the candidate devices, and providing the network communication anomaly conditions to the candidate device(s). In some implementations, network communication anomaly engine 230 may include network communication data receiver 231, candidate device identifier 232, network communication anomaly condition determiner 233, and network communication anomaly condition provider 234.

Network communication data receiver 231 is may be responsible for receiving network communication data from devices communicating with WAN accessible service 200. As noted above, WAN accessible service 200 can communicate with a variety of different devices which may or may not include embedded systems. Such devices can communicate with WAN accessible service 200 according to communication protocols associated with the devices (or device types/classes of devices). Also as noted above, the connected devices can establish networking communication sessions with WAN accessible service 200 that allow the devices to perform operations such as send notifications, send data associated with device state information, send data associated with sensor properties/measurements, interact with WAN accessible service 200 to obtain device commands/instructions to modify device settings/state, or the like.

In various implementations, each device type (or device class) can implement a particular communication protocol that establishes a particular sequence of messages to perform a specific function for the device. For example, a thermostat with an embedded system could communicate with WAN accessible service 200 using a protocol that specifies a series of messages to establish a communication session, authenticate the device to WAN accessible service 200, provide a temperature measurement to WAN accessible service, receive an acknowledgment from WAN accessible service 200, and terminate the communication session. It should be noted that other sequences of network communication messages can be implemented for other device types, device classes, and/or device functionalities.

In various implementations, network communication data receiver 231 can receive these network communication messages from connected devices and store them in a data store (e.g., persistent storage, disk storage, memory, etc.) accessible to WAN accessible service 200 (e.g., communication data 264). Alternatively, network communication data receiver 231 can receive network communication messages from a storage system that has received the messages from the devices. In such instances, network communication data receiver 231 can be invoked by network communication anomaly condition determiner 233 to retrieve messages for particular device type for determining the anomaly conditions as described below.

Candidate device identifier 232 may be responsible for identifying a set of candidate devices from the group of devices communicating with WAN accessible service 200.

Candidate device identifier 232 may identify the set of candidate devices using a selection criteria that includes one or more device attributes. In some implementations, the device attributes may include a device type, a device property (e.g., a serial number, a device type, device class, etc.), a client identifier (e.g., a unique identifier associated with the device owner or client), a device location (e.g., IP address, GPS location, mailing address of the device owner, etc.), a device usage value (e.g., the number of times a device has been used over a particular period of time), the current network communication anomaly version installed on the device (e.g., network communication anomaly version data 263), or other similar types of classification information associated with a device.

For example, candidate device identifier 232 may examine the group of devices and select only those devices that have matching device type. For example, candidate device identifier 232 may select only connected electronic thermostats. Similarly, candidate device identifier 232 can select a class of devices that use a compatible communication protocol. For example, candidate device identifier 232 can select electronic appliances that communicate in accordance with an equivalent (e.g., identical or compatible) sequence of network communication messages. In an illustrative example, a connected refrigerator and a connected thermostat may both communicate with WAN accessible service 200 to perform authentication and provide temperature measurements using a similar communication protocol for the temperature measurement functionality. In some implementations, candidate device identifier 232 may use a combination of selection criteria (e.g., all devices of a particular device type that are deployed in a particular geographic location). Once the set of candidate devices has been determined, identifying information for the identified candidate devices may be stored for later use with anomaly condition determination and deployment.

Network communication anomaly condition determiner 233 may be invoked to determine one or more network communication anomaly conditions that indicate abnormal network communication traffic for the device type associated with the set of candidate devices selected by candidate device identifier 232. As noted above, the idle state conditions may include a set of rules and/or a trained machine learning model that can be used by a device with an embedded system to identify anomalies in network communications. Network communication anomaly condition determiner can analyze the communication behaviors of a particular class of devices to determine how those devices communicate, how they establish connections, how much data they send/receive, and so on. By analyzing the typical or "normal" communication behavior for a class of devices (e.g., devices with the same device type), network communication anomaly condition determiner 233 can more readily identify anomalies in communication behavior for those devices.

In some implementations, network communication anomaly conditions can be associated with a particular communication message format, a particular communication protocol message content (e.g., the data fields/components of a message), a communication protocol message size (e.g., the total amount of data in a message), a communication protocol message source, a communication protocol message destination, a communication protocol message sequence (e.g., a known sequence of messages associated with performing a particular functionality for a device/device type), a particular level of observed communication activity (e.g., if network activity meets a threshold value), or the like.

In some implementations, the determined network communication anomaly conditions may be in the form of a rule set that is provided to the embedded system of a candidate device. In such instances, network communication anomaly condition determiner 233 can determine a sequence of messages for a particular networking function performed by the class of devices associated with the candidate device. The rule set can specify the sequence of messages for the candidate device to monitor. In some implementations, network communication anomaly condition determiner 233 can analyze the network communication data for the set of candidate devices and identify the networking communication functionality performed by the candidate devices. Network communication anomaly condition determiner 233 can then determine the sequence of networking messages associated with the networking functionality. Subsequently, network communication anomaly condition determiner 233 can determine attributes associated with each message in the sequence that indicate normal network communication traffic for the functionality.

In an illustrative example, network communication anomaly condition determiner 233 can analyze the network data for a particular type of thermostat to identify the operations performed by the functionality that reports temperature measurements. Network communication anomaly condition determiner 233 can determine the sequence of networking messages used by the thermostat to report a temperature measurement to the WAN accessible service 200 (or other connected service with which the device communicates). For example, network communication anomaly condition determiner 233 can determine that the thermostat establishes a connection with the WAN accessible service 200, sends an authorization request to WAN accessible service 200, receives an authorization approval message from WAN accessible service 200, sends a message with the temperature measurement to WAN accessible service 200, receives an acknowledgement from WAN accessible service 200, then terminates the session. For each identified message in the sequence, network communication anomaly condition determiner 233 can identify message attributes (e.g., message components, fields, settings, data sizes, etc.) that are associated with typical communication messages.

Network communication anomaly condition determiner 233 can then generate the rule set specifying the normal message conditions (e.g., sequence, format, etc.). Thus, any deviation from the normal message that is observed by the device can signify a communication anomaly. Alternatively, or additionally, network communication anomaly condition determiner 233 can generate the rule set such that it specifies anomaly conditions. Thus, if a device observes a particular condition specified in the rule set (e.g., a message size greater than a particular size, a message destination address set to a particular value, a number of messages in a sequence greater than a specified number of messages, etc.), it can recognize it as a communication anomaly. Alternatively, or additionally, network communication anomaly detection determiner 233 can train a machine learning model to process network communication data to identify whether or not it represents anomaly conditions.

In some implementations, the anomaly conditions may be generated in the form of a simplified machine learning classifier component that is executed by the embedded system of the candidate device. In such cases, inputs may be provided to the simplified classifier component to enable the simplified classifier component to detect the presence of the anomaly conditions. The inputs may be a set of device states, parameters, network activity and/or other device information. The inputs may be input into the simplified classifier as each message is sent received, or in the alternative, upon completion of a communication session. In some embodiments, the simplified classifier is a trained recurrent neural network (RNN) that uses current inputs as well as stored information on past inputs to determine whether an idle state condition is satisfied. Alternatively, the simplified classifier uses current inputs without utilizing stored information on past inputs.

In some implementations, network communication anomaly condition determiner 233 may receive the set of anomaly conditions and/or a trained machine learning model from a user interface of a management console (e.g., via graphical user interface 215). Alternatively, network communication anomaly condition determiner 233 may utilize a machine learning model (e.g., a neural network, deep network, RNN, etc.) to analyze any collected device related network communication data for the set of candidate devices to determine the set of anomaly conditions.

In an illustrative example, network communication anomaly condition determiner 233 may perform clustering on network communication data associated with the set of candidate devices to divide the network communication data into a first subset indicative of normal network communication traffic for the identified device functionality and a second subset indicative of an abnormal network communication traffic for the functionality. Network communication anomaly condition determiner 233 may then determine one or more network communication conditions for the first subset (the normal communication traffic) and one or more network communication conditions for the second subset (the abnormal communication traffic). Network communication anomaly condition determiner 233 may then generate a machine learning model trained to classify between the normal traffic and the abnormal traffic for a device.

In some implementations, the machine learning model may be provided to the embedded system of the device such that the embedded can input observed device conditions into the model and the model can indicate to the embedded system whether network communications are normal or abnormal (e.g., indicate an anomaly). As noted above, in instances where the embedded system of the device has limited resources to monitor network communications, network communication anomaly condition determiner 233 may provide a simplified machine learning model to the embedded system. In these instances, the simplified model can be configured to monitor for a particular set of anomaly conditions without the "intelligence" to relearn/retrain itself based on continued observation of network communication activity on the device. Thus, to monitor for new conditions, the simplified model should be regenerated and resent to the embedded system.

In some implementations, to generate the simplified model, network communication anomaly condition determiner 233 can determine a set of device constraints associated with the target device. The set of constraints can include at least one of a power consumption requirement (e.g., the electrical/battery power limits of the device) or a processing power requirement (e.g., the processor limits of the device) associated with the target device. Network communication anomaly condition determiner 233 can modify the machine learning model in view of the determined set of device constraints. For example, the machine learning model can be generated to make its communication anomaly assessment using as few processing resources as possible (e.g., limiting the number of calculations/comparisons used in making any probabilistic determinations to reduce the amount of processor power or energy used by the device).

In some implementations, network communication anomaly condition determiner 233 can generate the simplified model by generating a decision tree rule set that includes the message attributes associated with each message of the sequence of messages that indicate normal networking communication traffic for the network functionality. In such instances, the model can analyze messages for a communication session on a message by message basis to determine if the observed messages match the associated decision tree. Thus, the model can identify a communication anomaly by identifying any message (or group of messages) that deviate from the decision tree.

In some implementations, candidate device identifier 232 may again be invoked to select one or more of the candidate devices from the identified set of candidate devices to receive the anomaly conditions. In one embodiment, candidate device identifier 232 may select all of the identified candidate devices to receive the anomaly conditions. Alternatively, candidate device identifier 232 may select a subset of the identified candidate devices. In some implementations, candidate device identifier 232 may be invoked by graphical user interface 215 in response to a user selection of one or more candidate devices from the group.

Network communication anomaly condition provider 234 may be invoked to provide the anomaly conditions (e.g., network communication anomaly conditions 255) to the selected candidate devices. In one embodiment, network communication anomaly provider 234 can send the network communication anomaly conditions 255 to the candidate device(s) to cause the candidate device(s) to monitor for those conditions. In another embodiment network communication anomaly provider 233 may send a notification to the candidate device to cause the device to retrieve the network communication anomaly conditions 255 from WAN accessible service 200.

Network anomaly condition determiner 233 may continuously or periodically receive new network communication traffic data for one or more types of devices. Network anomaly condition determiner 233 may then periodically update a training of a machine learning model trained to perform anomaly detection of network communication traffic data using the new network communication traffic data. The newly trained or retrained machine learning models may then be distributed to edge devices to replace old versions of the trained machine learning models.

Figure 3:
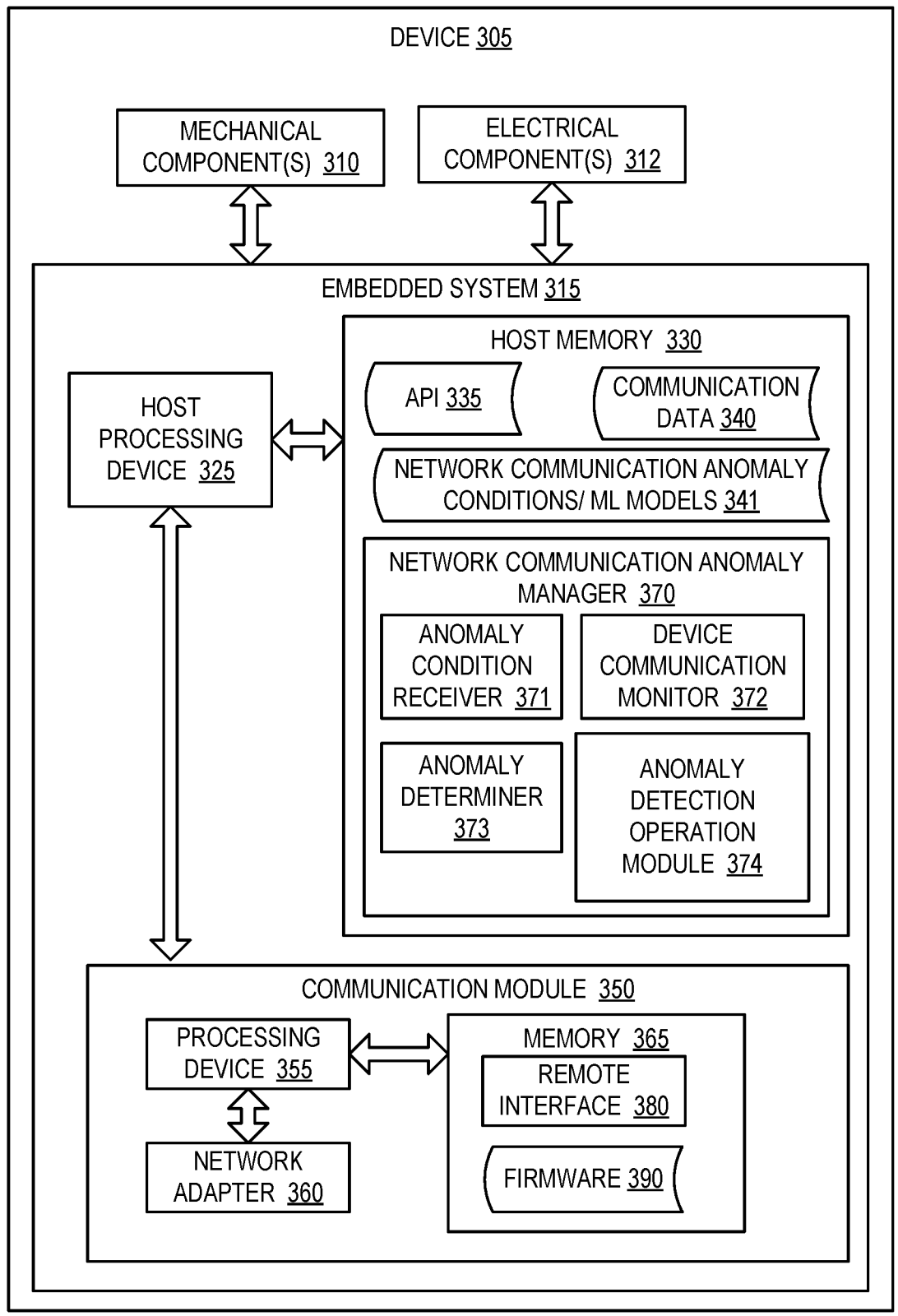
FIG. 3 is a block diagram of an example device having a remotely accessible embedded system.

FIG. 3 is a block diagram of an example device 305 having a remotely accessible embedded system 315. The device 305 may include any of the aforementioned types of devices having an embedded system, and in one embodiment corresponds to a device 145 of FIG. 1. In one embodiment, the device 305 includes mechanical components 310, electrical components 312 and an embedded system 315. The electrical components 312 and/or mechanical components 310 may include sensors, programmable logic controllers (PLCs), switches, motors, valves, actuators, and so forth.

The embedded system 315 may include a host processing device 325, a host memory 330 and/or a communication module 350 coupled to the host processing device 325. The embedded system 315 may also include numerous other components that are not shown herein. Examples of such additional components may include light emitting diodes (LEDs), a power supply regulator, fuses, ports, a user interface, digital to analog (D/A) converters, analog to digital (A/D) converters, field programmable gate arrays (FPGAs), application specific integrated circuits (ASICs), and so on.

Host processing device 325 may be a microcontroller or a digital signal processor (DSP) in one embodiment. Host processing device 325 may alternatively or additionally include a programmable logic controller (PLC), a field programmable gate array (FPGA) or a complex programmable logic device (CPLD). The host processing device 325 may be configured to perform specific functions related to the operation and control of the device 305.

Host memory 330 may include random access memory (RAM), read only memory (ROM), one time programmable (OTP) ROM, Flash (e.g., NOR Flash), or other types of memory. Host memory 330 may store an application programming interface (API) 335 for the communication module 350. The API 335 may enable the host processing device 325 to send commands and/or data to and receive commands and/or data from communication module 350.

Host memory 330 may additionally include communication data 340 for the device 305. Communication data 340 may include communication data for a currently active communication session and/or stored historical communication data over a particular time period. Host memory 330 may also include network communication anomaly conditions and/or a trained machine learning model 341. As described above, network communication anomaly conditions and/or a trained machine learning model 341 may be received from a WAN accessible service (e.g., WAN accessible service 200 of FIG. 2) to be used by embedded system 315 to monitor network communications for device 305 for communication anomalies. Host memory 330 may also include firmware for the host processing device 325 that configures the host processing device to perform one or more operations that are specific to device 305.

In some embodiments, the host memory 330 may be integrated into the host processing device 325. For example, microcontrollers typically include a processor core, memory and programmable input/output peripherals. Accordingly, if the host processing device 325 is a microcontroller, then host memory 330 may be a memory of host processing device 325.

Host memory 330 may include a network communication anomaly manager 370. Network communication anomaly manager 370 may be responsible for receiving the network communication anomaly conditions and/or trained machine learning model (network communication anomaly conditions 341) from a WAN accessible service, and monitoring the communication data 340 of device 305 for the presence of the network communication anomaly conditions using the trained machine learning model and/or the received network communication anomaly conditions. For example, network communication traffic data may be input into the trained machine learning model, which may output a classification of anomalous behavior or non-anomalous behavior. Once network communication anomaly conditions are detected, network communication anomaly manager 370 may then perform an anomaly detection operation for the embedded system 315. In some implementations, network communication anomaly manager 370 may correspond to the network communication anomaly manager 151 of FIG. 1. Network communication anomaly manager 370 may include an anomaly condition receiver 371, a device communication monitor 372, an anomaly determiner 373 and an anomaly detection operation module 374. Alternatively, the functionality of one or more of the anomaly condition receiver 371, a device communication monitor 372, an anomaly determiner 373 and an anomaly detection operation module 374 may be combined into a single module or divided into multiple sub-modules. While FIG. 3 depicts network communication anomaly manager 370 as a component of host memory 330, in some implementations network communication anomaly manager 370 (or its sub components) may be a component of memory 365 of communication module 350.

Anomaly condition receiver 371 is responsible for receiving one or more network communication anomaly conditions that indicate abnormal network communication traffic and/or a trained machine learning model usable to identify abnormal network communication traffic for the class of devices associated with device 305. For example, if device 305 is a IoT enabled thermostat, the anomaly conditions received may correspond to those conditions that indicate abnormal communication traffic for thermostats. In some implementations, as noted above, the anomaly conditions can be associated with a communication protocol message format, a communication protocol message content, a communication protocol message size, communication protocol a message source, a communication protocol message destination, a communication protocol message sequence, or a networking traffic level. In some embodiment, a trained machine learning model trained to perform network anomaly detection for thermostats is trained to receive feature vectors comprising information of network communication data associated with the thermostats, and to process such feature vectors to determine whether or not anomalous network conditions are identified.

Anomaly condition receiver 371 may receive the anomaly conditions and/or machine learning model from a WAN accessible service. Alternatively, Anomaly condition receiver 371 may receive the anomaly conditions and/or machine learning model from a remote control application executing on another device as a proxy for a WAN accessible service. Anomaly condition receiver 371 may be invoked by network communication anomaly manager 370 after receiving a notification from a WAN accessible service that a update to the anomaly conditions and/or machine learning model is available for device 305. In some implementations, the WAN accessible service may initiate data transmission to send the anomaly conditions and/or trained machine learning model. In such instances, the WAN accessible service can initiate a communication session with embedded system 315, invoking anomaly condition receiver 371 to receive the anomaly conditions and/or trained machine learning model. Alternatively, the WAN accessible service can send a notification that the anomaly conditions and/or trained machine learning model are ready to be downloaded. In these instances, embedded system 315 can receive the notification and subsequently invoke anomaly condition receiver 371 to retrieve the anomaly conditions and/or trained machine learning model (either from the WAN accessible service or another server location specified in the notification). Anomaly condition receiver 371 may then store the anomaly conditions and/or trained machine learning model in network communication anomaly conditions 341.

As noted above with respect to FIG. 1 and FIG. 2, the anomaly conditions may be a set of rules that network communication anomaly manager 370 can use when monitoring communication data 340. Alternatively, the anomaly conditions may be incorporated into a trained machine learning model as discussed such as a simplified machine learning classifier that is used by network communication anomaly manager 370 to detect the presence of a communication anomaly. In such instances, network communication anomaly manager 370 can input the observed communication data 340 into the classifier. The classifier can then indicate to network communication anomaly manager 370 whether the device 305 communicating normally or abnormally.

Device communication monitor 372 is responsible for monitoring communication data 340. In some implementations, device communication monitor 372 can be invoked by a component of communication module 350 each time a message is received by embedded system 315. In such instances, device communication monitor 372 can invoke anomaly determiner 373 to determine whether each message indicates the presence of a communication anomaly. In other implementations, device communication monitor 372 can be invoked by communication module 350 when a communication session is initiated between embedded system 315 and a WAN accessible service. In such instances, device communication monitor 372 can remain active for the duration of the communication session. In other implementations, device communication monitor 372 can be invoked at device start up and monitor stored communication data 340 asynchronously with the communication session. In other words, device communication monitor 372 can analyze the stored messages after they have been received rather than as they are received.

In various implementations, anomaly determiner 373 can be invoked by device communication monitor 372 to determine whether the network communications of device 305 satisfy the anomaly conditions included in network communication anomaly conditions 341. As noted above, network communication anomaly conditions 341 may be a set of rules that describe conditions indicating normal/valid communication message sequence flows for device 305. In such instances, anomaly determiner 373 can examine the information in communication data 340 using the set of rules in network communication anomaly conditions 341 to determine whether or not a communication anomaly is detected (e.g., whether device 305 is communicating abnormally). A deviation in the contents of communication data 341 from the normal/valid communication rules this can indicate a communication anomaly. In other implementations, the set of rules may indicate particular anomaly conditions for which to monitor. In such instances a match between the information in communication data 340 and the specified anomaly conditions can indicate a communication anomaly.

In other implementations, network communication anomaly conditions and/or trained machine learning model 341 may include a simplified machine learning classifier model that is used by anomaly determiner 373 to detect the presence of a communication anomaly for device 305. In such instances, anomaly determiner 373 can retrieve information from communication data 340 and input that information into the simplified machine learning classifier model. The model can then indicate to anomaly determiner 373 whether or not a communication anomaly is detected. In various embodiments, the machine learning classifier model is "simplified" in that it is a streamlined version of a model that does not continuously learn from additional input. As such, it may be sufficient to detect the presence of communication anomaly conditions without continuously analyzing previous communication activity of the device to refine what the anomaly conditions may include.

As noted above, in some implementations, anomaly determiner 373 can use the network communication anomaly conditions 341 to detect a device-based anomaly. A device-based anomaly can indicate a problem with the device 305 or embedded system 315 (e.g., an anomaly with the communication data generated by the device 305). In various implementations, anomaly determiner 373 can detect a device-based anomaly by determining that the communication data 340 indicates a network communication message that is directed to an unauthorized communication source, a network communication message that is directed to an authorized communication source that comprises content that is significantly different from an expected content, a network communication message sequence that is directed to an authorized communication source that is significantly different from an expected network communication message sequence, or the like.

In other implementations, anomaly determiner 373 can use the network communication anomaly conditions 341 to detect a server-based anomaly. A server-based anomaly can indicate a problem with a WAN accessible service or other server that has established a communication session with device 305 (e.g., an anomaly with the communication data associated with the WAN accessible service). In various implementations, anomaly determiner 373 can detect a server-based anomaly by determining that communication data 340 indicates an attempt to control the device 305 from an unauthorized communication source, a network communication message that is received from an authorized communication source that comprises content that is significantly different from an expected content, a network communication message sequence that is received from an authorized communication source that is significantly different from an expected network communication message sequence, or the like.

In various implementations, anomaly determiner 373 can determine the severity of a detected anomaly. In such instances, anomaly determiner 373 can use the determined severity to control any subsequent response to the detected anomaly as described below. For example, low severity anomalies such as a minor deviation in detected message size from "normal" communications may result in an alert sent to the WAN accessible service. In contrast, high severity anomalies such as a deviation in message sequence or an unauthorized communication source could cause a device shutdown. Anomaly determiner 373 can make this determination by determining a severity value of the detected anomaly condition. In some instances, the severity value can be calculated by anomaly determiner 373 as a probability or confidence level that indicates the likelihood that a particular communication message or series of communication messages indicate a communication anomaly. Additionally or alternatively, the severity value can be specified explicitly for particular message formats/sequences in the network communication anomaly conditions 341. In some implementations, the trained machine learning model outputs a determined severity level when an anomaly is identified.

In various implementations, anomaly determiner 373 can make the severity determination by comparing the determined severity value for the detected anomaly to a threshold. If the severity value satisfies the threshold (e.g., meets or exceeds a threshold value associated with high severity anomalies), anomaly determiner 373 can determine that the anomaly is high severity and invoke anomaly detection operation module 374 to take appropriate action for high severity anomalies as described below. Similarly, if the severity value does not satisfy the threshold, anomaly determiner 373 can determine that the anomaly is low severity and invoke anomaly detection operation module 374 to take appropriate action for low severity anomalies as described below.

Responsive to detecting a communication anomaly (e.g., communication data 340 satisfies one or more of network communication anomaly conditions 341), anomaly detection operation module 374 can be invoked to perform an anomaly detection operation for device 305. An anomaly detection operation can include sending an alert to a WAN accessible service (e.g., to an administrator application/console, email address, SMS address), send an alert to a connected remote control application associated with device 305 (e.g., remote control application 120 of FIG. 1), power down the device (e.g., force a device shutdown until an authentication signal/message/instruction is sent to the device to restore itself), disable communications (e.g., shut down particular communication ports, shut down all communication ports, terminate execution of communication module 350, etc.), cause device 305 to generate an audible or visual alert for the device (e.g., play an audible sound, flash an indicator light, display an error message, etc.), or the like.

As noted above, anomaly detection operation module 374 can perform different operations based on the severity of the detected anomaly. For example, if a high severity anomaly is detected, anomaly detection operation module 374 can send a notification to the WAN accessible service that indicates that a high severity anomaly condition has been detected. Additionally, anomaly detection operation module 374 can execute an instruction that performs at least one of disabling network communications for device 305 or powering down device 305. In contrast, if a low severity anomaly is detected, anomaly detection operation module 374 can send a notification to the WAN accessible service that indicates that a low severity anomaly condition has been detected. Additionally, anomaly detection operation module 374 can execute an instruction that provides an alert to device 305.

Similarly, anomaly detection operation module 374 can perform different operations based on whether the anomaly is device-based or server-based. For example, if a device-based anomaly is detected, anomaly detection operation module 374 can execute an instruction that performs at least one of disabling network communications for device 305 or powering down device 305. Additionally, if a server-based anomaly is detected, anomaly detection operation module 374 can execute an instruction that disables network communications with the suspect server for device 305. In some instances, anomaly detection operation module 374 can send a notification to other devices on the same network as device 305 that indicates a server-related anomaly so that those other devices can take action. For example, the notification can include an instruction to the other devices to disable the network connection to the suspect server.

In various implementations, network communication anomaly manager 370 can update the network communication anomaly conditions and/or trained machine learning model 341 based on observed activity on device 305. In one example, network communication anomaly conditions 341 can be updated based on an observed increase in detected anomalies for device 305. In such instances, each detected anomaly can be stored with the communication data 340. As additional anomalies are detected, anomaly detection operation module 374 can monitor the total number of anomaly conditions detected over a period of time. Anomaly detection operation module 374 can then determine whether the number of detected anomalies satisfies a predetermined threshold. If so, this can indicate that the contents of network communication anomaly conditions 341 may be out of date, and should be refreshed with an updated version. In such instances, anomaly detection operation module 374 can send a request to the WAN accessible service for an update to network communication anomaly conditions 341.

In another example, network communication anomaly conditions and/or trained machine learning model 341 can be updated based on a detected change to the hardware and/or software installed on device 305. In such instances, this type of change to device 305 can indicate that the "normal" communication conditions/message sequences may have changed and thus the currently stored anomaly conditions may be out of date. If a change to a hardware or software component of device 305 is detected, anomaly detection operation module 374 can send a request to the WAN accessible service for an update to network communication anomaly conditions 341.

In another example, network communication anomaly conditions and/or trained machine learning model 341 can be updated based on receiving a notification from a WAN accessible service that indicates a new version of the anomaly conditions and/or trained machine learning model is available for download to device 305. In such instances, anomaly detection operation module 374 can retrieve the updated anomaly conditions from the WAN accessible service and store the update in network communication anomaly conditions 341.

Communication module 350 may be an integrated circuit (IC) that is configured to be coupled to host processing device 325 of embedded system 315. Communication module 350 may be provided by a third party to a manufacturer of the device along with the API 335, and may enable network capability and remote control capability to be easily added to the device 305. The communication module 350 may include its own processing device 355, a memory 365 and/or a network adapter 360. The processing device 355 may be a microcontroller, a system on a chip (SoC), a digital signal processor (DSP), a programmable logic controller (PLC), a microprocessor or programmable logic device such as a field-programmable gate array (FPGA) or a complex programmable logic device (CPLD). The memory may include a non-volatile memory (e.g., RAM) and/or a volatile memory (e.g., ROM, Flash, etc.). In one embodiment, memory 365 is integrated into processing device 355. Memory 365 may store firmware 390 for the processing device 355, such as firmware that includes instructions for a remote interface 382.

Network adapter 360 may be a wired network adapter (e.g., an Ethernet adapter) or a wireless network adapter (e.g., a Wi-Fi® adapter or other wireless local area network (WLAN) adapter). Network adapter 360 may also be configured to provide connection to a network or other devices using Zigbee, PLC, Bluetooth, 6LowPAN, or other communication protocols. Network adapter 360 may receive notifications and other messages from a WAN accessible service and/or remote control applications. Network adapter 360 may additional send outgoing messages to the WAN accessible service and/or to remote control applications.

Remote interface 380 may be executed by processing device 355 to operate on messages and notifications received from a WAN accessible service and/or remote control applications. In some implementations, if device 305 is unable to communicate with a WAN accessible service, communication module 350 of embedded system 315 may operate as an access point (in AP mode) to communicate with the remote control application directly.

Remote interface 380 may also determine if there are sufficient resources to establish a session with the remote control application. For example, remote interface 380 may include sufficient resources to maintain LAN sessions with a particular number of remote control applications in one embodiment. In such an instance, remote interface 380 would determine whether the particular number of remote control applications already have sessions with the embedded system. If so, remote interface would not establish a connection with the new remote control application from which the notification was received. If there were fewer than the particular number of remote control applications with LAN sessions, then remote interface 380 would initiate session establishment.

After a session has been established, remote interface 380 may receive notifications from the remote control application and from any other remote control applications that also have active sessions. Additionally, remote interface 380 may receive notifications from the WAN accessible service. Each of the notifications may indicate that a sender of the notification has a message (e.g., a command or property update) for the embedded system 315. Remote interface 380 may or may not send acknowledgements of receipt of the notifications to senders. Additionally, remote interface 380 may place the notifications into a queue based on an order that they were received, and may process the notifications on a first in first out (FIFO) basis.

When a notification is to be processed, remote interface 382 sends a message to the sender of the notification requesting a message. The remote interface 382 then receives the requested message, decrypts it, and forwards any commands or property updates from the message on to host processing device 325. Host processing device 325 may perform one or more operations based on the commands, which may cause a state of one or more parameters or properties for the device 305 to change. The host processing device 325 may report the changed device state to processing device 355.

In one embodiment, a notification may be a request from a remote control application for device related information in order to determine if an update to the anomaly conditions 341 is available for embedded system 315. Remote interface 380 may retrieve the requested information from device state 340 and return it to the requesting remote control application.

In one embodiment, a notification may be received from a WAN accessible service that a update to the anomaly conditions is available to be retrieved from the WAN accessible service. The notification may include the location of the anomaly conditions stored on the device executing the WAN accessible service (e.g., as further described above with respect to FIG. 2). Remote interface 380 may then notify network communication anomaly manager 370 via API 335 to retrieve the update.

Remote interface 382 may generate a status update message, and may send it to a connected remote control application and/or to the WAN accessible service if an auto echo mode is enabled. If an auto echo mode is disabled, then the host processing device may determine which, if any, remote control applications and/or WAN accessible services will be notified of the state update, as well as when such updates will be distributed. For example, the host processing device 325 may determine to actively update LAN sessions for every state change and only update the WAN accessible service with latest information once a day. The WAN accessible service may then forward the status update to any remote control applications that are not directly connected to embedded system 315 over the LAN.

Processing device 355 may keep track of every remote control application and WAN accessible service it has an active session with. Reachability to the WAN accessible service may be detected in numerous ways. For example, remote interface 380 may attempt to POST to the WAN accessible service with status updates and/or may attempt to ping the WAN accessible service. If a POST attempt and/or ping attempt fails after one or more retries, processing device 355 may inform host processing device 325 that the WAN accessible service is unreachable. Remote interface 382 may then periodically attempt to reconnect to the WAN accessible service (e.g., every 5 minutes, every 10 minutes, or at some other interval).

In one embodiment, processing device 355 notifies host processing device 325 each time communication module 350 connects to or loses connection with a destination (e.g., with WAN accessible service or a remote control application). The host processing device 325 may use this information to keep track of WAN accessible service reachability and record which property updates/state changes have not been reported to the WAN accessible service in device state 340. Once a connection to the WAN accessible service is reestablished, host processing device 325 or processing device 355 may send all updates that the WAN accessible service missed.

Figure 4:
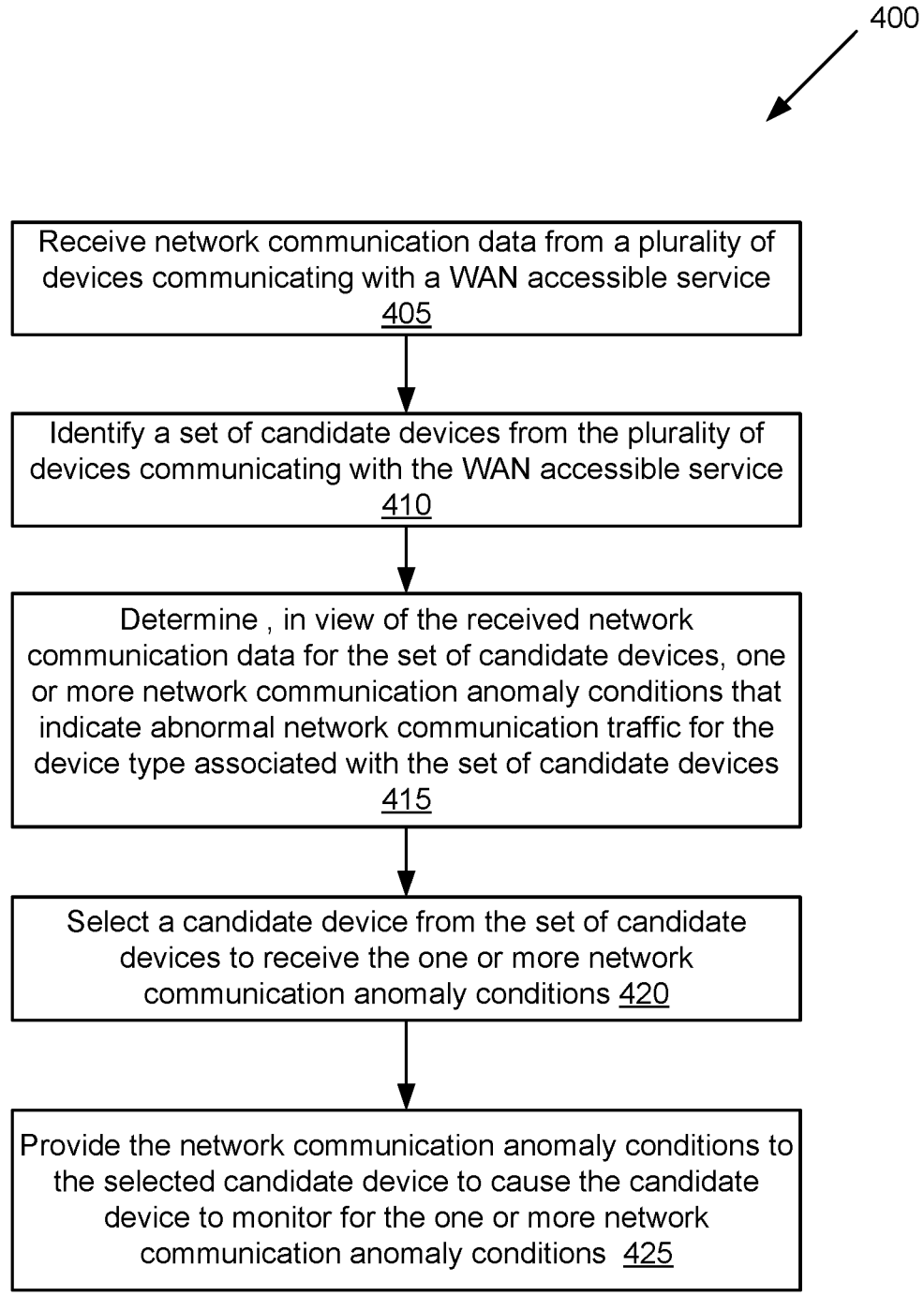
FIG. 4 is a flow chart of an example method for determining network communication anomaly conditions by a WAN accessible service.

FIG. 4 is a flow diagram of a method 400 for determining network communication anomaly conditions by a WAN accessible service. The method 400 may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the method 400 are performed by WAN accessible service 130 of FIG. 1 and/or WAN accessible service 200 of FIG. 2.

At block 405 of method 400, processing logic receives network communication data from a group of devices communicating with a WAN accessible service. In various implementations, the devices in the group of devices can include an internet of things (IoT) device comprising an embedded system. At block 410, processing logic identifies a set of candidate devices from the plurality of devices communicating with the WAN accessible service. In various implementations, the set of candidate devices are associated with the same device type.

At block 415, processing logic determines, in view of the received network communication data for the set of candidate devices, one or more network communication anomaly conditions that indicate abnormal network communication traffic for the device type associated with the set of candidate devices. In various implementations, an anomaly condition can involve at least one of a communication protocol message format, a communication protocol message content, a communication protocol message size, communication protocol a message source, a communication protocol message destination, a communication protocol message sequence, or a networking traffic level.

At block 420, processing logic selects a candidate device from the set of candidate devices to receive the one or more network communication anomaly conditions. In some implementations, the candidate device is an internet of things (IoT) device that includes an embedded system, where the embedded system subsequently monitors for the anomaly conditions. At block 425, processing logic provides the network communication anomaly conditions to the selected candidate device to cause the candidate device to monitor for the one or more network communication anomaly conditions. After block 425, the method of FIG. 4 terminates.

Figure 5:
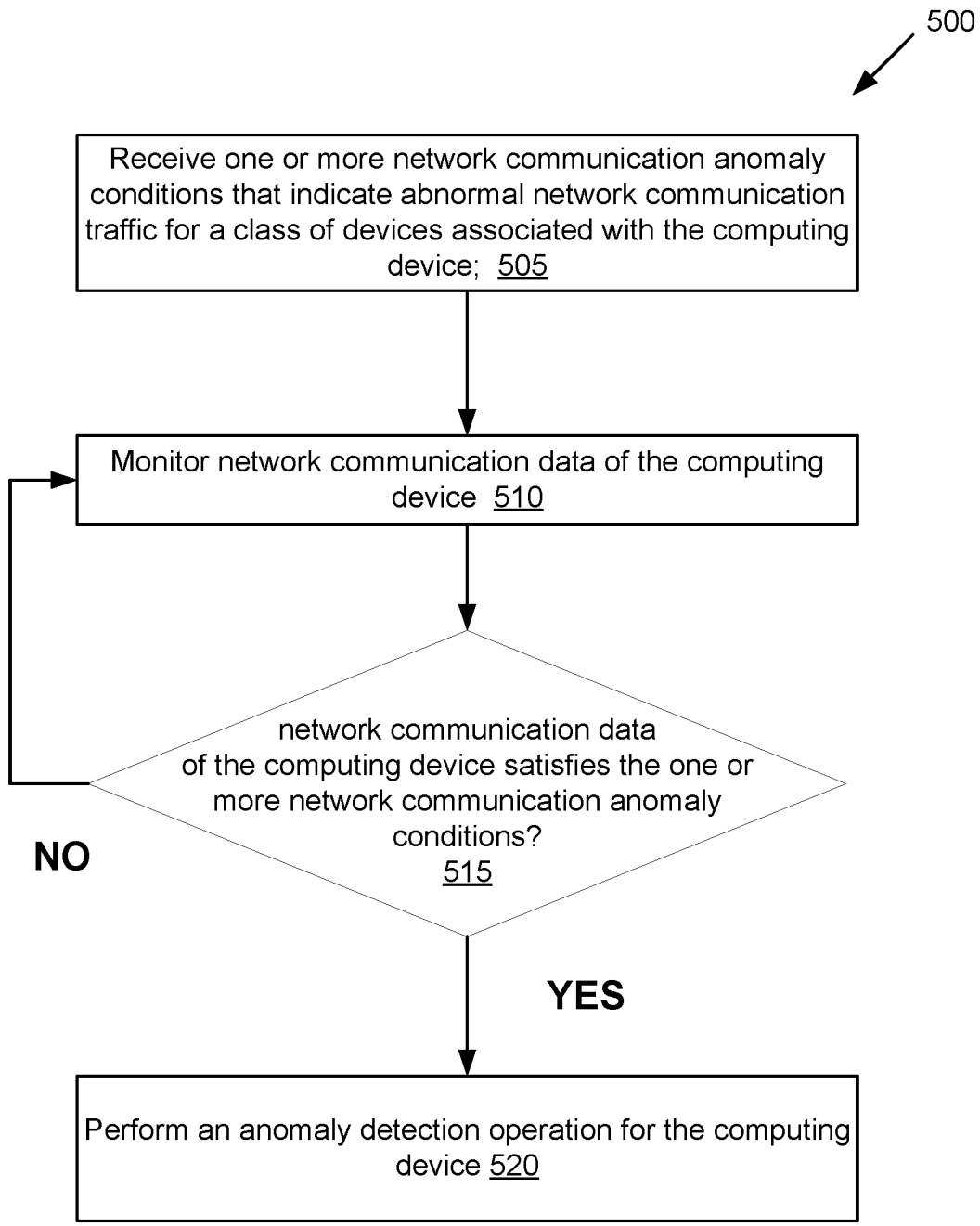
FIG. 5 is a flow chart of an example method for monitoring the network communication of a device for anomaly conditions.

FIG. 5 is a flow diagram of a method 500 for monitoring the network communication of a device for network communication anomaly conditions. The method 500 may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the method 500 are performed by a network communication anomaly manager, such as network communication anomaly manager 151 of FIG. 1 and/or network communication anomaly manager 370 of FIG. 3.

At block 505 of method 500 processing logic receives one or more network communication anomaly conditions that indicate abnormal network communication traffic for a class of devices. In some implementations, an anomaly condition can be associated with at least one of a communication protocol message format, a communication protocol message content, a communication protocol message size, communication protocol a message source, a communication protocol message destination, a communication protocol message sequence, or a networking traffic level. At block 510, processing logic monitors network communication data of a computing device (e.g., the computing device executing method 500).

At block 515, processing logic determines whether the network communication data of the computing device satisfies the one or more network communication anomaly conditions. If so, processing proceeds to block 520. In one embodiment, processing logic may make the determination by comparing a set of rules against the observed network communication data monitored at block 510. Alternatively, processing logic may make this determination by inputting the network communication data into a simplified machine learning model (e.g., a classifier). The classifier may then indicate whether or not the network communication data satisfies an anomaly condition.

If at block 515 processing logic determines that network communication data of the computing device does not satisfy the one or more network communication anomaly conditions, processing returns to block 510 to continue monitoring the network communication data of the computing device. At block 525, processing logic performs an anomaly detection operation for the computing device. After block 525, the method of FIG. 5 terminates.

Figure 6:
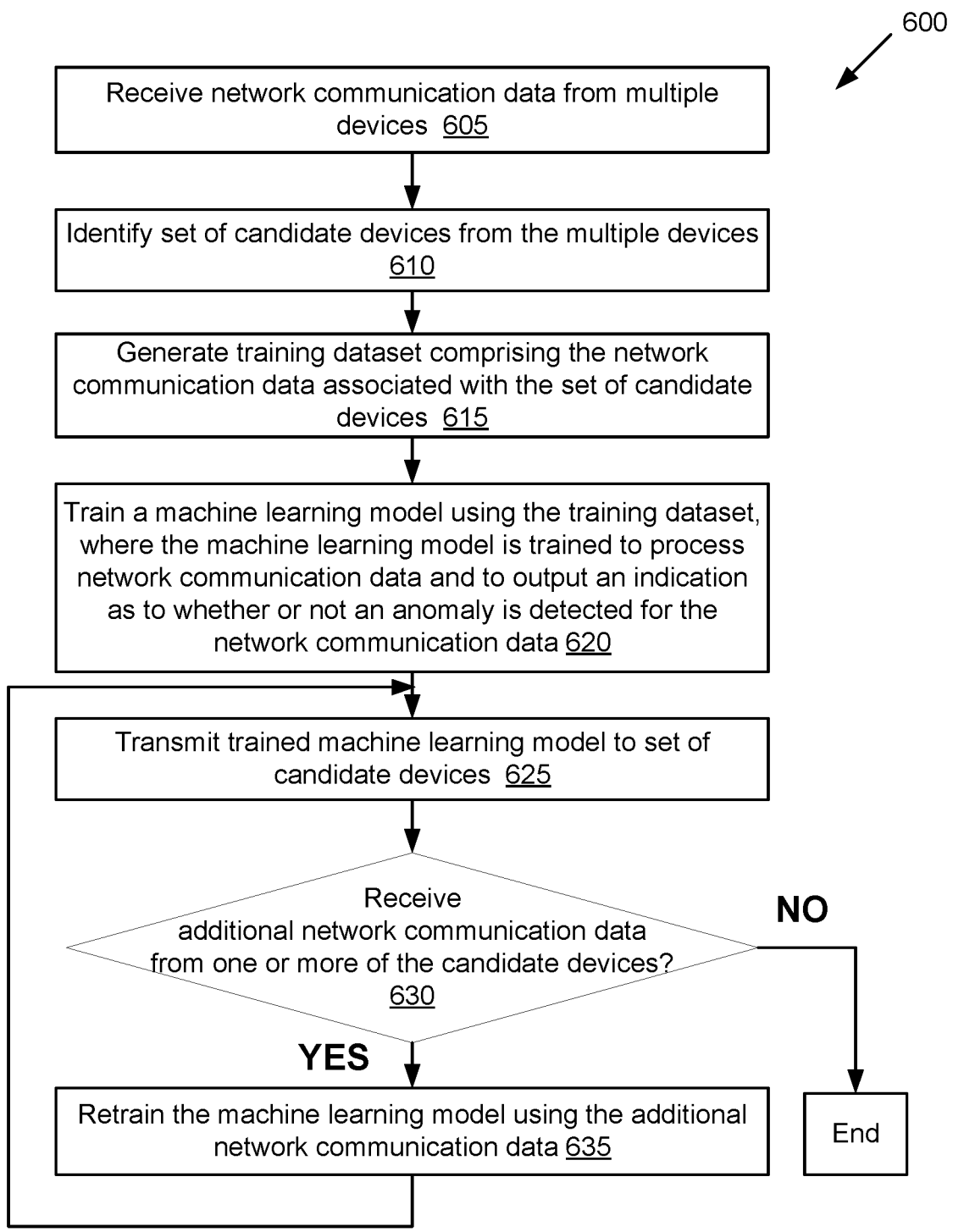
FIG. 6 is a flow chart of an example method for training a machine learning model to perform anomaly detection of network communication traffic.

FIG. 6 is a flow chart of an example method 600 for training a machine learning model to perform anomaly detection of network communication traffic/data. The method 600 may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the method 600 are performed by a WAN accessible service (such as WAN accessible service 130 of server computing device 125 of FIG. 1).

At block 605 of method 600 processing logic receives network communication data from multiple devices. The devices may be devices that communicate with a WAN accessible service. At block 610, processing logic identifies a set of candidate devices from the multiple devices. The set of candidate devices may be devices that share one or more properties and/or device types from the multiple devices. The multiple devices may include may different types of devices, which may have very different network traffic patterns. However, devices in the selected set of devices may have similar network traffic patterns. In an example, the set of candidate devices may all be thermostats, or may all be thermostats from a particular manufacturer and/or of a particular model.

At block 615, processing logic generates a training dataset comprising the network communication data associated with the set of candidate devices. In some instances, the data in the training dataset is manually labeled by a user. For example, the user may label some data as anomalous data and other data as non-anomalous data. In some instances, all data is assumed to be non-anomalous data. In some instances, processing logic performs clustering on the network communication data to divide the network communication data into a first subset indicative of normal network communication traffic for a communication functionality and/or a second subset indicative of abnormal network communication traffic for the communication functionality. Various clustering techniques may be used, examples of which include k-means clustering, mean-shift clustering, density-based spatial clustering, expectation-maximization clustering (optionally using Gaussian mixture models), and agglomerative hierarchical clustering. Processing logic may then label data items in the training dataset based on a result of the clustering. For example, data items falling in the cluster associated with standard network traffic may be labeled as normal, and data items falling in the cluster associated with abnormal network traffic may be labeled as anomalous. Data items may also be automatically or manually labeled with severity levels.

At block 620, processing logic trains a machine learning model using the training dataset. The machine learning model is trained to process network communication data and to output an indication as to whether or not an anomaly is detected for the network communication data. The machine learning model may also be trained to identify severity levels of anomalous network activity.

At block 625, processing logic transmits the trained machine learning model to the set of candidate devices. The candidate devices may then store the trained machine learning models and use them to detect anomalous network activity.

At block 630, processing logic may receive additional network communication data from one or more candidate devices. If no additional network traffic is received, the method ends. If additional network traffic is received, the method may proceed to block 635. At block 635, processing logic retrains the machine learning model using the additional network communication data. In some instances, the additional network communication data is manually or automatically labeled, such as using the techniques set forth above. In some embodiments, the original training data and the additional network communication data are used together to perform updated clustering to automatically identify anomalous clusters and/or normal operation clusters. The method then returns to block 625, and the retrained machine learning models are transmitted to at least some of the set of candidate devices.

Figure 7:
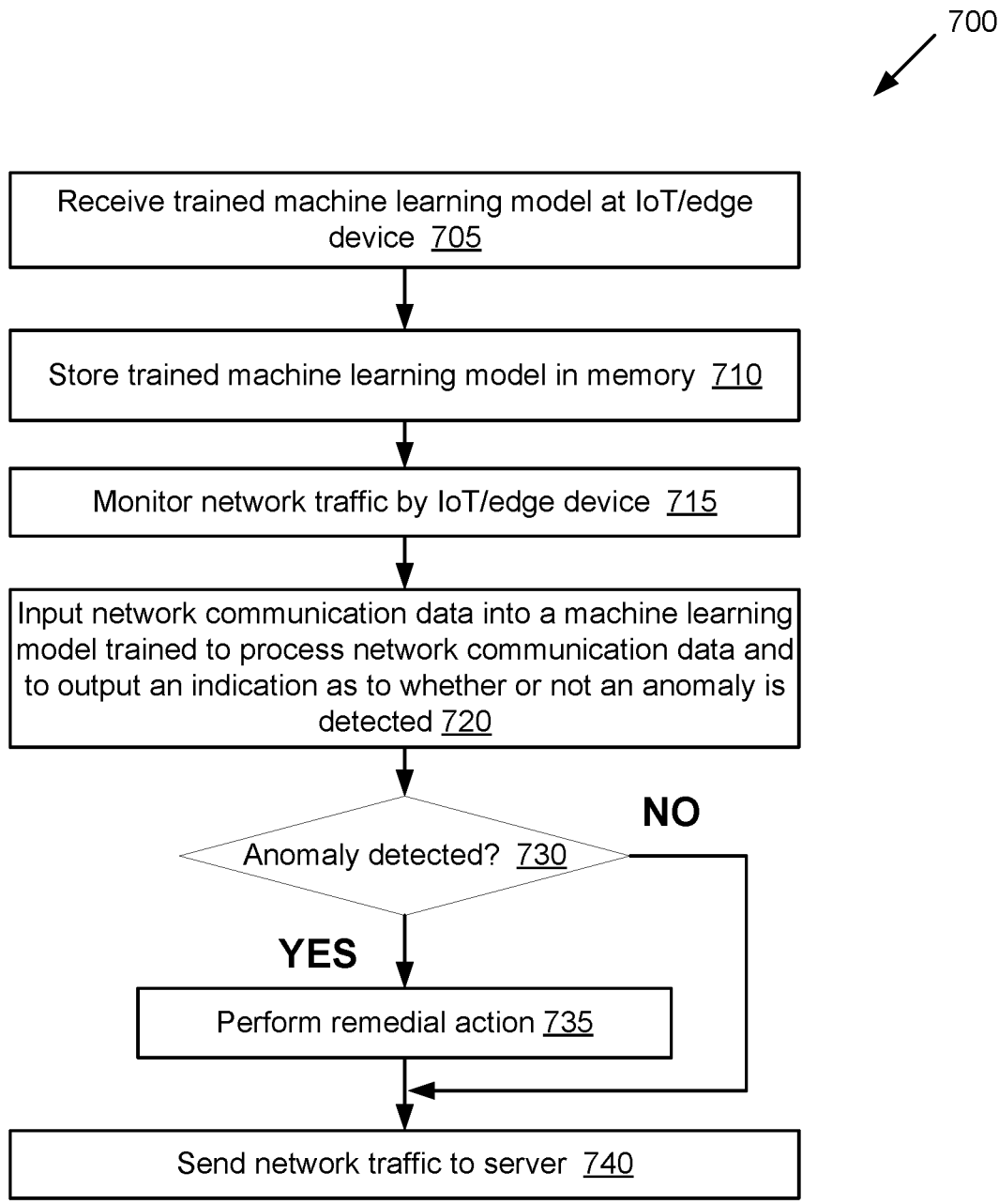
FIG. 7 is a flow chart of an example method for using a trained machine learning model deployed at an edge device to perform anomaly detection of network communication traffic.

FIG. 7 is a flow chart of an example method 700 for using a trained machine learning model deployed at an edge device to perform anomaly detection of network. The method 700 may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the method 700 are performed by an edge device or IoT device (such as device 145 of FIG. 1).

At block 705 of method 700, an edge device or IoT device receives a trained machine learning model. At block 710, the device stores the trained machine learning model in memory. The received trained machine learning model may be a retrained machine learning model, which may replace a previously received trained machine learning model in some instances.

At block 715, processing logic monitors network traffic of the IoT/edge device. At block 720, processing logic inputs network communication data (network traffic data) into a trained machine learning model trained to process network communication data and output an indication as to whether or not an anomaly is detected. The machine learning model may also be trained to output a severity level of detected anomalous activity.

At block 730, processing logic determines whether an anomaly is detected. If so, the method continues to block 735. Otherwise, the method proceeds to block 740.

At block 735, processing logic performs a remedial action in view of the detected anomalous activity. This may include performing an anomaly detection operation for the device, as discussed in detail above. In some embodiments, the action performed is based on a detected severity level of the anomalous activity.

At block 740, processing logic may send the network traffic to a server (e.g., to server computing device 125 of FIG. 1). In some instances, processing logic sends the network communication data as well as the output of the trained machine learning model. The server may include a more powerful trained machine learning model trained to detect anomalous network activity. The server may include more memory, more processing resources, less power constraints, and so on then the edge device, and so may use a trained machine learning model that is more accurate but that consumes more power, more processing resources, more memory resources, and so on than that on the edge device. The server may process the network communication data using the more powerful trained machine learning model, and may reach a different conclusion than was reached by the trained machine learning model of the edge device. The server may then send the output of the more powerful trained machine learning model and/or data based on the output to the edge device, which may than change its previous response. For example, if the edge device had not detected anomalous activity and the server did detect anomalous activity, then responsive to receiving the message from the server the edge device may perform one or more remedial actions. If the edge device had detected anomalous behavior but the server did not, then the edge device may undo prior remedial actions that were performed responsive to detecting anomalous behavior.

Additionally, or alternatively, the server may use the received network communication data to update a training of the machine learning model deployed to the edge device and/or to retrain a more powerful machine learning model used by the server.

Figure 8:
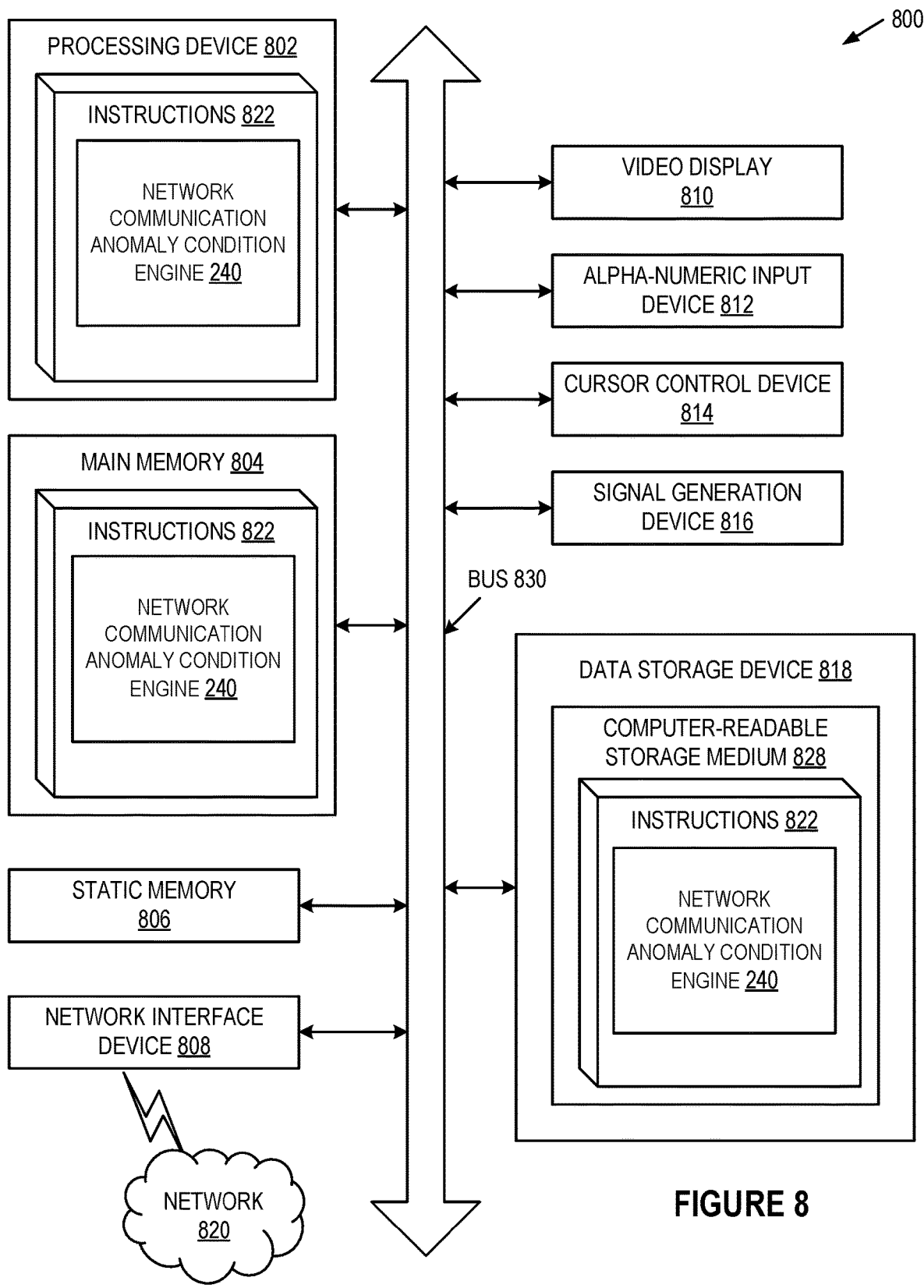
FIG. 8 illustrates a block diagram of one embodiment of a computing device.

FIG. 8 illustrates a diagrammatic representation of a machine in the example form of a computing device 800 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory (e.g., a data storage device 818), which communicate with each other via a bus 830.

Processing device 802 represents one or more general-purpose processors such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute the processing logic (instructions 822) for performing the operations and steps discussed herein.

The computing device 800 may further include a network interface device 808. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-readable storage medium (or more specifically a computer-readable storage medium) 828 on which is stored one or more sets of instructions 822 embodying any one or more of the methodologies or functions described herein. The instructions 822 may also reside, completely or at least partially, within the main memory 804 and/or within the processing device 802 during execution thereof by the computer system 800, the main memory 804 and the processing device 802 also constituting computer-readable storage media.

The computer-readable storage medium 828 may also be used to store a network communication anomaly detection engine 240 (as described with reference to FIG. 2), and/or a software library containing methods that call a network communication anomaly detection engine 240. While the computer-readable storage medium 828 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The modules, components and other features described herein (for example in relation to FIGS. 1-3) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "identifying", "determining", "selecting", "providing", "monitoring", "performing", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
receiving, by a processing device executing a wide area network (WAN) accessible service, network communication data from a plurality of devices communicating with the WAN accessible service;
identifying, based on a selection criterion, a set of candidate devices from the plurality of devices communicating with the WAN accessible service, wherein the set of candidate devices are of a same device type, wherein the selection criterion specifies a sequence of messages for transactions associated with the same device type;
determining, in view of the received network communication data for the set of candidate devices, one or more network communication anomaly conditions that indicate abnormal network communication traffic for the same device type associated with the set of candidate devices;
selecting a candidate device from the set of candidate devices to receive the one or more network communication anomaly conditions; and
providing the network communication anomaly conditions to the selected candidate device to cause the selected candidate device to monitor for the one or more network communication anomaly conditions.

2. The method of claim 1, wherein the one or more network communication anomaly conditions are associated with at least one of a communication protocol message format, a communication protocol message content, a communication protocol message size, a communication protocol message source, a communication protocol message destination, a communication protocol message sequence, or a networking traffic level.

3. The method of claim 1, wherein determining the network communication anomaly conditions further comprises:
analyzing the network communication data for the set of candidate devices;
identifying a network communication functionality performed by the set of candidate devices;
determining a sequence of networking messages associated with the network communication functionality; and
determining one or more one message attributes associated with each networking message of the sequence of networking messages that indicate normal network communication traffic for the network communication functionality.

4. The method of claim 3, further comprising:
performing clustering on the network communication data to divide the network communication data into a first subset indicative of normal network communication traffic for the network communication functionality and a second subset indicative of abnormal network communication traffic for the network communication functionality;

determining one or more normal network communication conditions for the first subset and one or more abnormal network communication conditions for the second subset based on a result of the clustering; and generating a machine learning model trained to classify between the normal network communications and the abnormal network communications.

5. The method of claim 4, further comprising:

determining at least one of a power consumption requirement or a processing power requirement associated with the selected candidate device;

modifying the machine learning model in view of the at least one of the power consumption requirement or the processing power requirement; and generating a simplified anomaly detection model for the same device type associated with the set of candidate devices in view of the modified machine learning model.

6. The method of claim 3, further comprising:

generating a decision tree rule set comprising the one or more one message attributes associated with each networking message of the sequence of networking messages that indicate normal network communication traffic for the network communication functionality.

7. The method of claim 1, wherein the selected candidate device is an internet of things (IoT) device comprising an embedded system, and wherein the embedded system monitors for anomaly network communication conditions using the network communication anomaly conditions.

8. The method of claim 1, wherein providing the network communication anomaly conditions to the selected candidate device further comprises:

sending the network communication anomaly conditions to the selected candidate device.

9. The method of claim 1, wherein providing the network communication anomaly conditions to the selected candidate device further comprises:

sending a notification to the selected candidate device to cause the selected candidate device to retrieve the network communication anomaly conditions from the WAN accessible service.

10. A method comprising:

receiving, by a computing device, one or more network communication anomaly conditions that indicate abnormal network communication traffic for a class of devices associated with the computing device, wherein the class of devices is associated with a sequence of messages for transactions performed by the computing device;

monitoring network communication data of the computing device;

determining whether the network communication data of the computing device satisfies the one or more network communication anomaly conditions; and responsive to determining that the network communication data of the computing device satisfies the one or more network communication anomaly conditions, performing, by the computing device, an anomaly detection operation for the computing device.

11. The method of claim 10, wherein performing the anomaly detection operation further comprises:

determining that the network communication data of the computing device indicates at least one of a network communication message directed to an unauthorized communication source, a network communication message directed to an authorized communication source that comprises content that is significantly different from an expected content, or a network communication message sequence directed to an authorized communication source that is significantly different from an expected network communication message sequence; and generating an alert indicating a computing device based anomaly.

12. The method of claim 10, wherein performing the anomaly detection operation further comprises:

determining that the network communication data of the computing device indicates at least one of an attempt to control the computing device from an unauthorized communication source, a network communication message from an authorized communication source that comprises content that is significantly different from an expected content, or a network communication message sequence from an authorized communication source that is significantly different from an expected network communication message sequence; and generating an alert indicating a server based anomaly.

13. The method of claim 10, wherein performing the anomaly detection operation further comprises:

determining a severity value of the determined network communication anomaly condition;

determining that the severity value satisfies a high severity threshold;

sending a notification to a wide area network (WAN) accessible service that indicates that a high severity anomaly condition has been detected; and executing an instruction that performs at least one of disabling network communications for the computing device or powering down the computing device.

14. The method of claim 10, wherein performing the anomaly detection operation further comprises:

determining a severity value of the determined network communication anomaly condition;

determining that the severity value does not satisfy a high severity threshold;

sending a notification to a wide area network (WAN) accessible service that indicates that a low severity anomaly condition has been detected.

15. The method of claim 10, further comprising:

monitoring a number of detected network communication anomaly conditions over a period of time;

determining that the number of detected network communication anomaly conditions satisfies a threshold; and sending a request to a wide area network (WAN) accessible service for an update to the one or more network communication anomaly conditions.

16. The method of claim 10, further comprising:

detecting a change to at least one of a hardware component of the computing device or a software component of the computing device; and sending a request to a wide area network (WAN) accessible service for an update to the one or more network communication anomaly conditions in view of the change.

17. The method of claim 10, further comprising:

receiving a notification from a WAN accessible service that indicates that the one or more network communication anomaly conditions are available for the computing device;

retrieving the one or more network communication anomaly conditions from the WAN accessible service; and storing the one or more network communication anomaly conditions in a memory of the computing device.

18. The method of claim 10, wherein the computing device is an internet of things (IoT) device comprising an embedded system.

19. A system comprising:
a server computing device comprising:
a memory; and
a processing device operatively coupled to the memory, the processing device to:
receive network communication data from a plurality of devices communicating with a wide area network (WAN) accessible service;
identify, based on a selection criterion, a set of candidate devices from the plurality of devices communicating with the WAN accessible service, wherein the set of candidate devices are of a same device type, wherein the selection criterion specifies a sequence of messages for transactions associated with the same device type;
generate a training dataset comprising the network communication data associated with the set of candidate devices;
train a machine learning model using the training dataset, wherein the machine learning model is trained to process additional network communication data and to output an indication as to whether or not an anomaly is detected for the additional network communication data; and
transmit the trained machine learning model to one or more devices in the set of candidate devices.

20. The system of claim 19, further comprising:
a device from the set of candidate devices, the device comprising an additional memory and an additional processing device, wherein the additional processing device is to:
receive the trained machine learning model;
store the trained machine learning model in the additional memory;
monitor network communication data of the device;
input the network communication data of the device into the trained machine learning model, wherein the trained machine learning model is to generate an output indicating whether or not an anomaly is detected; and
perform an action based on whether or not an anomaly is detected.

21. The system of claim 20, wherein responsive to the trained machine learning model outputting an indication that an anomaly is detected, the additional processing device is further to perform an anomaly detection operation for the device.

22. The system of claim 19, wherein the processing device is further to:
receive additional network communication data from the one or more devices in the set of candidate devices;
retrain the machine learning model using the additional network communication data to generate an updated machine learning model; and
transmit the updated machine learning model to the one or more devices in the set of candidate devices.

23. The system of claim 19, wherein the processing device is further to:
perform clustering on the network communication data to divide the network communication data into a first subset indicative of normal network communication traffic for a communication functionality and a second subset indicative of abnormal network communication traffic for the communication functionality; and
label data items in the training dataset based on a result of the clustering;
wherein the machine learning model is an artificial neural network.

* * * * *